US011683793B2

(12) United States Patent
Yang et al.

(10) Patent No.: US 11,683,793 B2
(45) Date of Patent: Jun. 20, 2023

(54) SIDELINK POWER CONTROL USING SHARED RESOURCES

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Huilin Xu, Temecula, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/343,523

(22) Filed: Jun. 9, 2021

(65) Prior Publication Data
US 2021/0392646 A1 Dec. 16, 2021

Related U.S. Application Data

(60) Provisional application No. 63/038,016, filed on Jun. 11, 2020.

(51) Int. Cl.
H04W 72/04 (2023.01)
H04W 72/044 (2023.01)
(Continued)

(52) U.S. Cl.
CPC ....... *H04W 72/0473* (2013.01); *H04W 52/10* (2013.01); *H04W 52/143* (2013.01); *H04W 72/23* (2023.01); *H04W 92/18* (2013.01)

(58) Field of Classification Search
CPC . H04W 52/242; H04W 24/10; H04W 52/383; H04W 52/08; H04W 92/18;
(Continued)

(56) References Cited

U.S. PATENT DOCUMENTS 11,343,777 B2 * 5/2022 Guo ...................... H04L 1/0026
2016/0212780 A1 * 7/2016 Stojanovski .......... H04W 8/005
(Continued)

FOREIGN PATENT DOCUMENTS

WO WO-2020096693 A1 5/2020

OTHER PUBLICATIONS

International Search Report and Written Opinion—PCT/US2021/036858—ISA/EPO—dated Oct. 28, 2021.
(Continued)

*Primary Examiner* — Jung Liu
(74) *Attorney, Agent, or Firm* — Holland & Hart / Qualcomm

(57) ABSTRACT

Methods, systems, and devices for wireless communication are described. A user equipment (UE) that is configured with two sets of power control parameters may be signaled (e.g., via downlink control information (DCI)) as to which set of parameters to use for determining the transmission power on a sidelink channel. The UE may determine a transmit power for a sidelink message based on the indication included in the DCI. The base station may transmit the indication based on whether uplink or downlink communications are scheduled on resources that may overlap with resources used for transmission of the sidelink message.

29 Claims, 18 Drawing Sheets

(51) Int. Cl.
*H04W 52/10* (2009.01)
*H04W 52/14* (2009.01)
*H04W 72/23* (2023.01)
*H04W 92/18* (2009.01)

(58) Field of Classification Search
CPC ... H04W 52/14; H04W 52/38; H04W 52/367; H04W 52/346; H04W 52/143
See application file for complete search history.

(56) References Cited

U.S. PATENT DOCUMENTS

| | | | |
|---|---|---|---|
| 2016/0249355 A1* | 8/2016 | Chae | H04L 5/0091 |
| 2017/0048807 A1 | 2/2017 | Wang | |
| 2018/0054237 A1* | 2/2018 | Tseng | H04W 72/542 |
| 2018/0070264 A1* | 3/2018 | Saiwai | H04W 72/04 |
| 2018/0146491 A1* | 5/2018 | Kim | H04W 24/10 |
| 2018/0235027 A1* | 8/2018 | Adachi | H04W 8/005 |
| 2018/0255444 A1* | 9/2018 | Chae | H04L 25/03866 |
| 2019/0014490 A1* | 1/2019 | Kim | H04W 88/04 |
| 2019/0052411 A1 | 2/2019 | Chae | |
| 2019/0215817 A1* | 7/2019 | Chae | H04W 56/0015 |
| 2019/0261309 A1* | 8/2019 | Martin | H04W 68/005 |
| 2019/0363779 A1* | 11/2019 | Chae | A01D 3/04 |
| 2020/0084592 A1* | 3/2020 | Gulati | H04W 4/12 |
| 2020/0100048 A1* | 3/2020 | Wu | H04W 28/0268 |
| 2020/0100088 A1* | 3/2020 | Kim | H04W 48/16 |
| 2020/0100167 A1* | 3/2020 | Cheng | H04W 80/02 |
| 2020/0145932 A1 | 5/2020 | Lee et al. | |
| 2020/0146000 A1* | 5/2020 | Shin | H03G 3/3089 |
| 2020/0178221 A1 | 6/2020 | Byun et al. | |
| 2020/0187298 A1* | 6/2020 | Chun | H04W 68/02 |
| 2021/0144528 A1* | 5/2021 | Chae | H04W 72/20 |
| 2021/0258988 A1* | 8/2021 | Balakrishnan | H04W 72/1263 |
| 2021/0337485 A1* | 10/2021 | Ryu | H04W 76/14 |
| 2021/0410084 A1* | 12/2021 | Li | H04W 52/265 |
| 2022/0030580 A1* | 1/2022 | Lee | H04W 72/0406 |
| 2022/0039021 A1* | 2/2022 | Ryu | H04W 52/242 |
| 2022/0110075 A1* | 4/2022 | Zhao | H04W 52/383 |
| 2022/0159583 A1* | 5/2022 | Wang | H04W 52/383 |
| 2022/0159588 A1* | 5/2022 | Wang | H04W 52/383 |
| 2022/0232490 A1* | 7/2022 | Jiang | H04W 52/242 |

OTHER PUBLICATIONS

Panasonic: "Discussion on Physical Layer Procedures for Sidelink in NR V2X", 3GPP Draft, 3GPP TSG RAN WG1 #99, R1-1912754, 3rd Generation Partnership Project (3GPP), Mobile Competence Centre, 650, Route Des Lucioles, F-06921 Sophia-Antipolis Cedex, France, vol. RAN WG1, No. Reno, US, Nov. 18, 2019-Nov. 22, 2019, Nov. 8, 2019 (Nov. 8, 2019), XP051820190, 6 Pages, Retrieved from the Internet: URL: https://ftp.3gpp.org/tsg_ran/WG1_RL1/ TSGR1 _99/Docs/R1-1912754.zip. R1-1912754.docx. [retrieved on Nov. 8, 2019] pp. 3-4, section 2.2.

* cited by examiner

SIDELINK POWER CONTROL USING SHARED RESOURCES

CROSS REFERENCE

The present application for patent claims the benefit of U.S. Provisional Patent Application No. 63/038,016 by YANG et al., entitled "SIDELINK POWER CONTROL USING SHARED RESOURCES," filed Jun. 11, 2020, assigned to the assignee hereof, and expressly incorporated by reference herein.

INTRODUCTION

The following relates to wireless communication and more specifically to managing sidelink power. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first UE is described. The method may include receiving, from a base station, a downlink control information (DCI) message that includes an indication to use one or both of a first set of power control parameters and a second set of power control parameters for a sidelink message and transmitting, to a second UE, the sidelink message using a transmission power that is based on the indication to use one or both of the first set of power control parameters and the second set of power control parameters.

An apparatus for wireless communications at a first UE is described. The apparatus may include a processor, memory coupled with the processor, the processor and memory configured to receive, from a base station, a DCI message that includes an indication to use one or both of a first set of power control parameters and a second set of power control parameters for a sidelink message and transmit, to a second UE, the sidelink message using a transmission power that is based on the indication to use one or both of the first set of power control parameters and the second set of power control parameters.

Another apparatus for wireless communications at a first UE is described. The apparatus may include means for receiving, from a base station, a DCI message that includes an indication to use one or both of a first set of power control parameters and a second set of power control parameters for a sidelink message and means for transmitting, to a second UE, the sidelink message using a transmission power that is based on the indication to use one or both of the first set of power control parameters and the second set of power control parameters.

A non-transitory computer-readable medium storing code for wireless communications at a first UE is described. The code may include instructions executable by a processor to receive, from a base station, a DCI message that includes an indication to use one or both of a first set of power control parameters and a second set of power control parameters for a sidelink message and transmit, to a second UE, the sidelink message using a transmission power that is based on the indication to use one or both of the first set of power control parameters and the second set of power control parameters.

Some examples of the method, apparatuses, and non-transitory computer-readable medium described herein may further include operations, features, means, or instructions for receiving, from the base station, a radio resource control signal or the DCI message that indicates the first set of power control parameters and the second set of power control parameters.

In some examples of the method, apparatuses, and non-transitory computer-readable medium described herein, receiving the DCI message may include operations, features, means, or instructions for receiving the DCI message that includes a field with the indication to use one or both of the first set of power control parameters or the second set of power control parameters, where the sidelink message may be transmitted using the transmission power determined in accordance with a value included in the field.

In some examples of the method, apparatuses, and non-transitory computer-readable medium described herein, the field includes a bit flag.

In some examples of the method, apparatuses, and non-transitory computer-readable medium described herein, receiving the DCI message may include operations, features, means, or instructions for receiving the DCI message that schedules at least one resource for the sidelink message to be transmitted to the second UE.

In some examples of the method, apparatuses, and non-transitory computer-readable medium described herein, transmitting the sidelink message may include operations, features, means, or instructions for determining that the DCI message includes the indication to use either the first set of power control parameters or the second set of power control parameters, where both the first set of power control parameters and the second set of power control parameters may be associated with a downlink pathloss from the base station to the first UE and transmitting the sidelink message using the transmission power that may be determined based on the first set of power control parameters or the second set of power control parameters in accordance with the indication.

In some examples of the method, apparatuses, and non-transitory computer-readable medium described herein, transmitting the sidelink message may include operations, features, means, or instructions for determining that the DCI message includes the indication to use the second set of power control parameters for the sidelink message, where the first set of power control parameters may be associated with a downlink pathloss from the base station to the first UE and the second set of power control parameters may be associated with a sidelink pathloss between the first UE and the second UE and transmitting the sidelink message using the transmission power that may be determined based on the second set of power control parameters in accordance with the indication.

In some examples of the method, apparatuses, and non-transitory computer-readable medium described herein, transmitting the sidelink message may include operations, features, means, or instructions for determining that the DCI message includes the indication to use both the first set of power control parameters and the second set of power control parameters for the sidelink message, where the first set of power control parameters may be associated with a downlink pathloss from the base station to the first UE and the second set of power control parameters may be associated with a sidelink pathloss between the first UE and the second UE, identifying a lower transmission power of a first transmission power determined using the first set of power control parameters and a second transmission power determined using the second set of power control parameters, and transmitting the sidelink message using the lower transmission power based on determining that the DCI message includes the indication to use both the first set of power control parameters and the second set of power control parameters.

In some examples of the method, apparatuses, and non-transitory computer-readable medium described herein, transmitting the sidelink message may include operations, features, means, or instructions for determining that the DCI message includes the indication to use either the first set of power control parameters or the second set of power control parameters, where both the first set of power control parameters and the second set of power control parameters may be associated with a sidelink pathloss between the first UE and the second UE and transmitting the sidelink message using the transmission power that may be determined based on the first set of power control parameters or the second set of power control parameters in accordance with the indication.

In some examples of the method, apparatuses, and non-transitory computer-readable medium described herein, receiving the DCI message may include operations, features, means, or instructions for receiving the DCI message in a group common DCI message that includes the indication for each resource of a set of resources, where the transmission power may be determined based at in least in part on a resource used for transmission of the sidelink message.

In some examples of the method, apparatuses, and non-transitory computer-readable medium described herein, receiving the DCI message may include operations, features, means, or instructions for receiving the DCI message in a group common DCI message that includes the indication for each UE of a set of UEs, where the transmission power may be determined based on the indication that corresponds to the first UE.

In some examples of the method, apparatuses, and non-transitory computer-readable medium described herein, receiving the DCI message may include operations, features, means, or instructions for receiving, from the base station, an indication of a radio network temporary identifier that corresponds to a group common DCI message and receiving the DCI message in the group common DCI message that may be scrambled by the radio network temporary identifier and includes the indication.

Some examples of the method, apparatuses, and non-transitory computer-readable medium described herein may further include operations, features, means, or instructions for identifying a value for a target receive power and a value for a pathloss compensation component for the first set of power control parameters and the second set of power control parameters.

Some examples of the method, apparatuses, and non-transitory computer-readable medium described herein may further include operations, features, means, or instructions for identifying a value for a target receive power for the first set of power control parameters and the second set of power control parameters.

Some examples of the method, apparatuses, and non-transitory computer-readable medium described herein may further include operations, features, means, or instructions for identifying a value for a target receive power for the first set of power control parameters and an offset value and identifying a value for a target receive power for the second set of power control parameters based on the value for the target receive power for the first set of power control parameters and the offset value.

Some examples of the method, apparatuses, and non-transitory computer-readable medium described herein may further include operations, features, means, or instructions for determining that the sidelink message may be associated with a first priority and identifying the first set of power control parameters and the second set of power control parameters based on the first priority.

Some examples of the method, apparatuses, and non-transitory computer-readable medium described herein may further include operations, features, means, or instructions for receiving a control signal that indicates sets of parameters to utilize per geographical zone of a set of geographical zones, identifying a geographical zone in which the first UE or the second UE may be positioned, and identifying the first set of power control parameters and the second set of power control parameters based on the identified geographical zone.

A method for wireless communications at a base station is described. The method may include transmitting, to the first UE, a DCI message that includes an indication to use one or both of a first set of power control parameters and a second set of power control parameters for a sidelink message based on at least one resource for communication with the second UE and communicating with the second UE using the at least one resource.

An apparatus for wireless communications at a base station is described. The apparatus may include a processor, memory coupled with the processor, the processor and memory configured to transmit, to the first UE, a DCI message that includes an indication to use one or both of a first set of power control parameters and a second set of power control parameters for a sidelink message based on at least one resource for communication with the second UE and communicate with the second UE using the at least one resource.

Another apparatus for wireless communications at a base station is described. The apparatus may include means for transmitting, to the first UE, a DCI message that includes an indication to use one or both of a first set of power control parameters and a second set of power control parameters for a sidelink message based on at least one resource for communication with the second UE and means for communicating with the second UE using the at least one resource.

A non-transitory computer-readable medium storing code for wireless communications at a base station is described. The code may include instructions executable by a processor to transmit, to the first UE, a DCI message that includes an indication to use one or both of a first set of power control parameters and a second set of power control parameters for a sidelink message based on at least one resource for communication with the second UE and communicate with the second UE using the at least one resource.

Some examples of the method, apparatuses, and non-transitory computer-readable medium described herein may further include operations, features, means, or instructions for transmitting, to the first UE, a radio resource control signal or the DCI message that indicates the first set of power control parameters and the second set of power control parameters.

In some examples of the method, apparatuses, and non-transitory computer-readable medium described herein, transmitting the DCI message may include operations, features, means, or instructions for transmitting the DCI message that includes a field with the indication to use one or both of the first set of power control parameters or the second set of power control parameters.

In some examples of the method, apparatuses, and non-transitory computer-readable medium described herein, the field includes a bit flag.

In some examples of the method, apparatuses, and non-transitory computer-readable medium described herein, transmitting the DCI message may include operations, features, means, or instructions for transmitting the DCI message that schedules at least one second resource for the sidelink message.

Some examples of the method, apparatuses, and non-transitory computer-readable medium described herein may further include operations, features, means, or instructions for determining the indication based on identifying that the at least one second resource partially overlaps with the at least one resource.

Some examples of the method, apparatuses, and non-transitory computer-readable medium described herein may further include operations, features, means, or instructions for identifying a geographical zone associated with the first UE or a third UE scheduled to receiving a sidelink message from the first UE and determining the indication based on geographical zone.

Some examples of the method, apparatuses, and non-transitory computer-readable medium described herein may further include operations, features, means, or instructions for transmitting a control signal that indicates sets of parameters to utilize per geographical zone of a set of geographical zones.

A method for wireless communications at a first UE is described. The method may include receiving, from a base station, a DCI message that includes an indication to use one or both of a first set of power control parameters and a second set of power control parameters for a sidelink message and receiving, from the second UE, a sidelink message at a receive power that is based on the indication to use one or both of the first set of power control parameters and the second set of power control parameters.

An apparatus for wireless communications at a first UE is described. The apparatus may include a processor, memory coupled with the processor, the processor and memory configured to receive, from a base station, a DCI message that includes an indication to use one or both of a first set of power control parameters and a second set of power control parameters for a sidelink message and receive, from the second UE, a sidelink message at a receive power that is based on the indication to use one or both of the first set of power control parameters and the second set of power control parameters.

Another apparatus for wireless communications at a first UE is described. The apparatus may include means for receiving, from a base station, a DCI message that includes an indication to use one or both of a first set of power control parameters and a second set of power control parameters for a sidelink message and means for receiving, from the second UE, a sidelink message at a receive power that is based on the indication to use one or both of the first set of power control parameters and the second set of power control parameters.

A non-transitory computer-readable medium storing code for wireless communications at a first UE is described. The code may include instructions executable by a processor to receive, from a base station, a DCI message that includes an indication to use one or both of a first set of power control parameters and a second set of power control parameters for a sidelink message and receive, from the second UE, a sidelink message at a receive power that is based on the indication to use one or both of the first set of power control parameters and the second set of power control parameters.

Some examples of the method, apparatuses, and non-transitory computer-readable medium described herein may further include operations, features, means, or instructions for determining, based on the DCI message, that a second UE is to transmit the sidelink message to the first UE using a transmission power that may be determined in accordance with the indication.

In some examples of the method, apparatuses, and non-transitory computer-readable medium described herein, receiving the DCI message may include operations, features, means, or instructions for receiving the DCI message in a group common DCI message that includes the indication for each UE of a set of UEs.

Some examples of the method, apparatuses, and non-transitory computer-readable medium described herein may further include operations, features, means, or instructions for receiving the DCI message in a group common DCI message that includes the indication for each resource of a set of resources.

A method of wireless communications at a first UE is described. The method may include identifying, at the first UE, a first set of power control parameters and a second set of power control parameters. The method may further include receiving, from a base station, a DCI message that includes an indication to use one or both of the first set of power control parameters and the second set of power control parameters for a sidelink message. The method may further include transmitting, to a second UE, the sidelink message using a transmission power that is determined based on the indication to use one or both of the first set of power control parameters and the second set of power control parameters.

An apparatus for wireless communications at a first UE is described. The apparatus may include a processor, memory coupled with the processor. The processor and memory may be configured to identify, at the first UE, a first set of power control parameters and a second set of power control parameters. The processor and memory may be further configured to receive, from a base station, a DCI message that includes an indication to use one or both of the first set of power control parameters and the second set of power control parameters for a sidelink message. The processor and memory may be further configured to transmit, to a second UE, the sidelink message using a transmission power that is determined based on the indication to use one or both of the first set of power control parameters and the second set of power control parameters.

Another apparatus for wireless communications at a first UE is described. The apparatus may include means for identifying, at the first UE, a first set of power control parameters and a second set of power control parameters. The apparatus may further include means for receiving, from a base station, a DCI message that includes an indication to use one or both of the first set of power control parameters and the second set of power control parameters for a sidelink message. The apparatus may further include means for transmitting, to a second UE, the sidelink message using a transmission power that is determined based on the indication to use one or both of the first set of power control parameters and the second set of power control parameters.

A non-transitory computer-readable medium storing code for wireless communications at a first UE is described. The code may include instructions executable by a processor to identify, at the first UE, a first set of power control parameters and a second set of power control parameters. The code may include further instructions executable by a processor to receive, from a base station, a DCI message that includes an indication to use one or both of the first set of power control parameters and the second set of power control parameters for a sidelink message. The code may include further instructions executable by a processor to transmit, to a second UE, the sidelink message using a transmission power that is determined based on the indication to use one or both of the first set of power control parameters and the second set of power control parameters.

In some examples of the method, apparatuses, and non-transitory computer-readable medium described herein, identifying the first set of power control parameters and the second set of power control parameters may include operations, features, means, or instructions for receiving, from the base station, a radio resource control signal or the DCI message that indicates the first set of power control parameters and the second set of power control parameters.

In some examples of the method, apparatuses, and non-transitory computer-readable medium described herein, receiving the DCI message may include operations, features, means, or instructions for receiving the DCI message that includes a field with the indication to use one or both of the first set of power control parameters or the second set of power control parameters. The sidelink message may be transmitted using the transmission power determined in accordance with a value included in the field.

In some examples of the method, apparatuses, and non-transitory computer-readable medium described herein, the field includes a bit flag.

In some examples of the method, apparatuses, and non-transitory computer-readable medium described herein, receiving the DCI message may include operations, features, means, or instructions for receiving the DCI message that schedules at least one resource for the sidelink message to be transmitted to the second UE.

In some examples of the method, apparatuses, and non-transitory computer-readable medium described herein, transmitting the sidelink message may include operations, features, means, or instructions for determining that the DCI message includes the indication to use either the first set of power control parameters or the second set of power control parameters. Both the first set of power control parameters and the second set of power control parameters may be associated with a downlink pathloss from the base station to the first UE. Transmitting the sidelink message may further include operations, features, means, or instructions for transmitting the sidelink message using the transmission power that may be determined based on the first set of power control parameters or the second set of power control parameters in accordance with the indication.

In some examples of the method, apparatuses, and non-transitory computer-readable medium described herein, transmitting the sidelink message may include operations, features, means, or instructions for determining that the DCI message includes the indication to use the second set of power control parameters for the sidelink message. The first set of power control parameters may be associated with a downlink pathloss from the base station to the first UE and the second set of power control parameters may be associated with a sidelink pathloss between the first UE and the second UE. Transmitting the sidelink message may further include operations, features, means, or instructions for transmitting the sidelink message using the transmission power that may be determined based on the second set of power control parameters in accordance with the indication.

In some examples of the method, apparatuses, and non-transitory computer-readable medium described herein, transmitting the sidelink message may include operations, features, means, or instructions for determining that the DCI message includes the indication to use both the first set of power control parameters and the second set of power control parameters for the sidelink message. The first set of power control parameters may be associated with a downlink pathloss from the base station to the first UE and the second set of power control parameters may be associated with a sidelink pathloss between the first UE and the second UE. Transmitting the sidelink message may further include operations, features, means, or instructions for identifying a lower transmission power of a first transmission power determined using the first set of power control parameters and a second transmission power determined using the second set of power control parameters. Transmitting the sidelink message may further include operations, features, means, or instructions for transmitting the sidelink message using the lower transmission power based on determining that the DCI message includes the indication to use both the first set of power control parameters and the second set of power control parameters.

In some examples of the method, apparatuses, and non-transitory computer-readable medium described herein, transmitting the sidelink message may include operations, features, means, or instructions for determining that the DCI message includes the indication to use either the first set of power control parameters or the second set of power control parameters. Both the first set of power control parameters and the second set of power control parameters may be associated with a sidelink pathloss between the first UE and the second UE. Transmitting the sidelink message may further include operations, features, means, or instructions for transmitting the sidelink message using the transmission power that may be determined based on the first set of power control parameters or the second set of power control parameters in accordance with the indication.

In some examples of the method, apparatuses, and non-transitory computer-readable medium described herein, receiving the DCI message may include operations, features, means, or instructions for receiving a group common DCI message that includes the indication for each resource of a set of resources. The transmission power may be determined based in least in part on a resource used for transmission of the sidelink message.

In some examples of the method, apparatuses, and non-transitory computer-readable medium described herein, receiving the DCI message may include operations, features, means, or instructions for receiving a group common DCI message that includes the indication for each UE of a set of UEs. The transmission power may be determined based on the indication that corresponds to the first UE.

In some examples of the method, apparatuses, and non-transitory computer-readable medium described herein, receiving the DCI message may include operations, features, means, or instructions for receiving, from the base station, an indication of a radio network temporary identifier that corresponds to a group common DCI message, and receiving the group common DCI message that includes the indication.

In some examples of the method, apparatuses, and non-transitory computer-readable medium described herein, identifying the first set of power control parameters and the second set of power control parameters may include operations, features, means, or instructions for identifying a value for a target receive power and a value for a pathloss compensation component for the first set of power control parameters and the second set of power control parameters.

In some examples of the method, apparatuses, and non-transitory computer-readable medium described herein, identifying the first set of power control parameters and the second set of power control parameters may include operations, features, means, or instructions for identifying a value for a target receive power for the first set of power control parameters and the second set of power control parameters.

In some examples of the method, apparatuses, and non-transitory computer-readable medium described herein, identifying the first set of power control parameters and the second set of power control parameters may include operations, features, means, or instructions for identifying a value for a target receive power for the first set of power control parameters and an offset value, and identifying a value for a target receive power for the second set of power control parameters based on the value for the target receive power for the first set of power control parameters and the offset value.

In some examples of the method, apparatuses, and non-transitory computer-readable medium described herein, identifying the first set of power control parameters and the second set of power control parameters may include operations, features, means, or instructions for determining that the sidelink message may be associated with a first priority, and identifying the first set of power control parameters and the second set of power control parameters based on the first priority.

In some examples of the method, apparatuses, and non-transitory computer-readable medium described herein, identifying the first set of power control parameters and the second set of power control parameters may include operations, features, means, or instructions for receiving a control signal that indicates sets of parameters to utilize per geographical zone of a set of geographical zones, identifying a geographical zone in which the first UE or the second UE may be positioned, and identifying the first set of power control parameters and the second set of power control parameters based on the identified geographical zone.

A method of wireless communications at a base station is described. The method may include determining, that a first UE is configured with a first set of power control parameters and a second set of power control parameters. The method may further include determining at least one first resource for a communication with a second UE. The method may further include transmitting, to the first UE, a DCI message that includes an indication to use one or both of the first set of power control parameters and the second set of power control parameters for a sidelink message based on the at least one resource for the communication with the second UE, and communicating with the second UE using the at least one resource.

An apparatus for wireless communications at a base station is described. The apparatus may include a processor, memory coupled with the processor, the processor and memory configured to determine, that a first UE is configured with a first set of power control parameters and a second set of power control parameter. The processor and memory may be further configured to determine at least one first resource for a communication with a second UE. The processor and memory may be further configured to transmit, to the first UE, a DCI message that includes an indication to use one or both of the first set of power control parameters and the second set of power control parameters for a sidelink message based on the at least one resource for the communication with the second UE. The processor and memory may be further configured to communicate with the second UE using the at least one resource.

Another apparatus for wireless communications at a base station is described. The apparatus may include means for determining, that a first UE is configured with a first set of power control parameters and a second set of power control parameters, The apparatus may further include means for determining at least one first resource for a communication with a second UE. The apparatus may further include means for transmitting, to the first UE, a DCI message that includes an indication to use one or both of the first set of power control parameters and the second set of power control parameters for a sidelink message based on the at least one resource for the communication with the second UE. The apparatus may further include means for communicating with the second UE using the at least one resource.

A non-transitory computer-readable medium storing code for wireless communications at a base station is described. The code may include instructions executable by a processor to determine, that a first UE is configured with a first set of power control parameters and a second set of power control parameters. The code may further include instructions executable by a processor to determine at least one first resource for a communication with a second UE. The code may further include instructions executable by a processor to transmit, to the first UE, a DCI message that includes an indication to use one or both of the first set of power control parameters and the second set of power control parameters for a sidelink message based on the at least one resource for the communication with the second UE. The code may further include instructions executable by a processor to communicate with the second UE using the at least one resource.

In some examples of the method, apparatuses, and non-transitory computer-readable medium described herein, determining that the first UE may be configured with the first set of power control parameters and the second set of power control parameters may include operations, features, means, or instructions for transmitting, to the first UE, a radio resource control signal or the DCI message that indicates the first set of power control parameters and the second set of power control parameters.

In some examples of the method, apparatuses, and non-transitory computer-readable medium described herein, transmitting the DCI message may include operations, features, means, or instructions for transmitting the DCI that includes a field with the indication to use one or both of the first set of power control parameters or the second set of power control parameters.

In some examples of the method, apparatuses, and non-transitory computer-readable medium described herein, the field includes a bit flag.

In some examples of the method, apparatuses, and non-transitory computer-readable medium described herein, transmitting the DCI message may include operations, features, means, or instructions for transmitting the DCI message that schedules at least one second resource for the sidelink message.

Some examples of the method, apparatuses, and non-transitory computer-readable medium described herein may further include operations, features, means, or instructions for determining the indication based on identifying that the at least one second resource partially overlaps with the at least one first resources.

Some examples of the method, apparatuses, and non-transitory computer-readable medium described herein may further include operations, features, means, or instructions for determining the indication based on identifying that the at least one second resource may be different from the at least one first resource.

Some examples of the method, apparatuses, and non-transitory computer-readable medium described herein may further include operations, features, means, or instructions for transmitting the DCI that indicates that the first UE is to use either the first set of power control parameters or the second set of power control parameters, Both the first set of power control parameters and the second set of power control parameters may be associated with a downlink pathloss from the base station to the first UE.

In some examples of the method, apparatuses, and non-transitory computer-readable medium described herein, transmitting the DCI message may include operations, features, means, or instructions for transmitting the DCI that indicates that the first UE is to use the second set of power control parameters for the sidelink message. The first set of power control parameters may be associated with a downlink pathloss from the base station to the first UE, and the second set of power control parameters may be associated with a sidelink pathloss.

In some examples of the method, apparatuses, and non-transitory computer-readable medium described herein, transmitting the DCI message may include operations, features, means, or instructions for transmitting the DCI that indicates that the first UE is to use both the first set of power control parameters and the second set of power control parameters for the sidelink message. The first set of power control parameters may be associated with a downlink pathloss from the base station to the first UE and the second set of power control parameters may be associated with a sidelink pathloss.

In some examples of the method, apparatuses, and non-transitory computer-readable medium described herein, transmitting the DCI message may include operations, features, means, or instructions for transmitting the DCI that indicates that the first UE is to use either the first set of power control parameters or the second set of power control parameters. Both the first set of power control parameters and the second set of power control parameters may be associated with a sidelink pathloss.

In some examples of the method, apparatuses, and non-transitory computer-readable medium described herein, transmitting the DCI message may include operations, features, means, or instructions for transmitting a group common DCI message that includes the indication for each resource of a set of resources.

In some examples of the method, apparatuses, and non-transitory computer-readable medium described herein, transmitting the DCI message may include operations, features, means, or instructions for transmitting a group common DCI message that includes the indication for each UE of a set of UEs.

In some examples of the method, apparatuses, and non-transitory computer-readable medium described herein, transmitting the DCI message may include operations, features, means, or instructions for transmitting, to the first UE, an indication of a radio network temporary identifier that corresponds to a group common DCI message, and transmitting the group common DCI that includes the indication.

In some examples of the method, apparatuses, and non-transitory computer-readable medium described herein, determining that the first UE may be configured with the first set of power control parameters and the second set of power control parameters may include operations, features, means, or instructions for transmitting a control signal that indicates a value for a target receive power and a value for a pathloss compensation component for the first set of power control parameters and the second set of power control parameters.

In some examples of the method, apparatuses, and non-transitory computer-readable medium described herein, determining that the first UE may be configured with the first set of power control parameters and the second set of power control parameters may include operations, features, means, or instructions for transmitting a control signal that indicates a value for a target receive power for the first set of power control parameters and the second set of power control parameters.

In some examples of the method, apparatuses, and non-transitory computer-readable medium described herein, determining that the first UE may be configured with the first set of power control parameters and the second set of power control parameters may include operations, features, means, or instructions for transmitting a control signal that indicates a value for a target receive power for the first set of power control parameters and an offset value that indicates a value for a target receive power for the second set of power control parameters.

In some examples of the method, apparatuses, and non-transitory computer-readable medium described herein, determining that the first UE may be configured with the first set of power control parameters and the second set of power control parameters may include operations, features, means, or instructions for transmitting a control signal that indicates that the first set of power control parameters and the second set of power control parameters may be associated with a first priority.

Some examples of the method, apparatuses, and non-transitory computer-readable medium described herein may further include operations, features, means, or instructions for identifying a geographical zone associated with the first UE or a third UE scheduled to receive a sidelink message from the first UE, and determining the indication based on geographical zone.

In some examples of the method, apparatuses, and non-transitory computer-readable medium described herein, determining that the first UE may be configured with the first set of power control parameters and the second set of power control parameters may include operations, features, means, or instructions for transmitting a control signal that indicates sets of parameters to utilize per geographical zone of a set of geographical zones.

DETAILED DESCRIPTION

Figure 1:
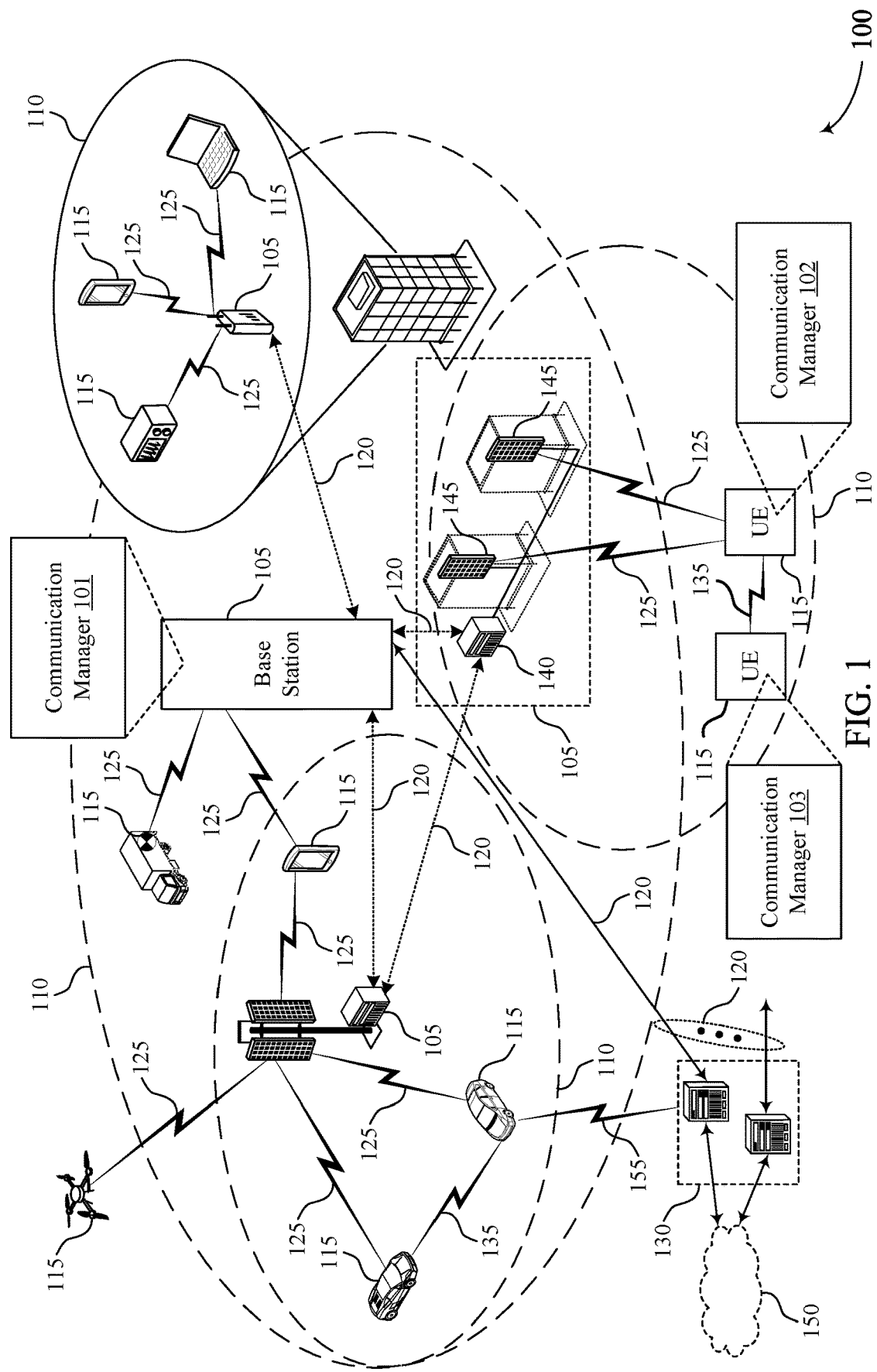
FIG. 1 illustrates an example of a system for wireless communication that supports sidelink power control using shared resources in accordance with one or more aspects of the present disclosure.

Some wireless communications systems may support device to device communications between user equipments (UEs). In some cases, these UEs may communicate over sidelink channels, which may be referred to as PC5 links. The sidelink communications may be allocated to a resource pool that is configured at the UE (e.g., preconfigured or signaled). In some examples, a base station may configure a sidelink channel that includes resources that overlap with uplink resources corresponding to an uplink channel between a UE and the base station (e.g., cellular network connection via a logical interface (UU)). The resources that may be shared between the UU and PC5 channel may be semi-statically scheduled (e.g., by resource pool configuration).

UEs may be configured with one or more sets of power control parameters for controlling transmission power. For example, a UE may be configured with an uplink power control parameter that is used to identify transmission powers for uplink transmissions. The parameters and a determined pathloss corresponding to the channel between the UE and the base station may be used to determine the transmission power for the uplink transmission. In some cases, the UEs may be also be configured with one or more sidelink power control parameters that may be used for determining transmission power for transmissions on a sidelink channel. In such cases, the UE may utilize a pathloss corresponding to the sidelink channel in addition to the sidelink power control parameters to determine the sidelink transmission power. The respective power control parameters and pathlosses may be used in accordance with open loop power control procedures to determine the respective transmission powers. In some cases, when a UE is configured with both sidelink and uplink power control parameters, the UE may utilize the minimum or lowest transmission power from transmission powers determined using each set of power control parameters (and respective pathlosses) as the transmission power for sidelink communications. The minimum or lowest may be used in order to limit potential interference with uplink communications by other UEs during the resources allocated for the sidelink channel, since the sidelink channel may utilize resources that overlap with the resources of uplink channels. However, the utilization of the minimum transmission power may limit the amount of sidelink power unnecessarily, since a power that is higher than the determined minimum may be used without unduly interfering with the uplink communications at the base station.

Aspects of the disclosure described herein may provide techniques that may increase the power of sidelink communications between UEs while also limiting the potential of the sidelink communications interfering with uplink communications at the base station. A UE that is configured with two sets of power control parameters may be signaled (e.g., via DCI) as to which set of parameters to use for determining the transmission power on a sidelink channel. Thus, when a base station is scheduling sidelink communications via the DCI, the base station may account for uplink communications that are scheduled for other UEs within a cell. As a result, if uplink communications are scheduled that may overlap with the sidelink communications, the base station may indicate that the sidelink UE is to use the parameters that may result in lower transmit power to reduce the potentiality of interference with the scheduled uplink communications. Conversely, if other UEs are not scheduled for uplink communications that may interfere with the sidelink communications (e.g., no overlapping resources), then the DCI may indicate that the sidelink UE is to use the power control parameters that results in a higher transmission power.

These techniques may be applicable when a UE is configured with two sets of parameters that both use uplink pathloss for sidelink power determination, with two sets of parameters that both use sidelink pathloss for sidelink power determination, or with one set of parameters that use uplink pathloss and one set of parameters that use sidelink pathloss. Further, UEs may consider priorities of sidelink transmissions when selecting parameters for sidelink transmission power. In some examples, the DCI may be an example of a group common DCI that indicates the set of parameters to use per resource of a set of resources or per UE of a set of UEs. The group common DCI indication technique may be used for mode 2 sidelink communications. In some examples, the group common DCI may be received by both a sidelink transmitting UE and a sidelink receiving UE, and the sidelink receiving UE may determine that the sidelink transmitting UE is to use one or both sets of power control parameters for communicating a sidelink message to the sidelink receiving UE.

By using multiple sets of power control parameters and using various techniques for determining which parameters to use, the described techniques may support decreased signaling overhead, increased reliability and efficiencies, etc. in the sidelink communication framework. As such, supported techniques may support reliable network operations and, in some examples, may promote network efficiencies.

Aspects of the disclosure are initially described in the context of wireless communications systems. Aspects of the disclosure are further described with respect to wireless communications systems and process flow diagrams. Aspects of the disclosure are further illustrated by and described with reference to apparatus diagrams, system diagrams, and flowcharts that relate to sidelink power control using shared resources.

FIG. 1 illustrates an example of a wireless communications system 100 that supports sidelink power control using shared resources in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some examples, a UE 115 may be configured with one or more sets of power control parameters that may be used for determining a transmission power. For example, a UE 115 may be configured with a set of parameters that may be used to determine a transmit power for uplink communications between the UE 115 and a base station 105 and using an open loop power control procedure. The UE 115 may be additionally configured with a set of parameters that may be used to determine a transmit power for sidelink communications between the UE 115 and another UE 115. In cases where the UE 115 is configured with a single set of parameters, the UE 115 may use the parameters for both uplink and sidelink transmission power determinations. If, however, the UE 115 is configured with two sets of parameters, then the UE 115 may select the lower of the two transmission powers (determined using the respective parameter sets and pathlosses) in order to avoid interference with uplink communications with the base station 105, since the sidelink channel may use resources that overlap with uplink channels associated with the base station 105. In some examples, utilization of the minimum may limit the reliability and efficiency of sidelink communications, since a power greater than the minimum or lowest may be used without interfering with the uplink communications at the base station 105.

In accordance with techniques described herein, a UE 115 that is configured with two sets of power control parameters may be signaled (e.g., via DCI) by a communication manager 101 of a base station 105 as to which power control parameter to use for determining sidelink transmission power. The two sets of parameters may be configured using radio resource control (RRC) signaling, DCI signaling, or the like. The DCI may also schedule the resources for the sidelink communications. As such, the DCI may include a bit flag or field that indicates the power control parameters in addition to a grant that schedules the sidelink resource. Accordingly, because the base station 105 may have scheduled uplink communications with other UEs 115 on resources that at least partially overlap with the sidelink resources being scheduled, the base station 105 may indicate that the UE 115 is to use the set of parameters that may result in a lower transmission power in order to avoid potential interference with the uplink communications by the other UEs 115. Conversely, if the base station 105 has not scheduled such uplink transmissions (e.g., that may overlap with the sidelink resource), then the base station 105 may indicate (e.g., via the DCI) that the UE 115 is to use the power control parameters that result in a higher sidelink transmission power. A communication manager 102 of the UE 115 may determine a transmit power for a sidelink communications using the indicated set of power control parameters. In some examples, a UE 115 (e.g., the communication manager 102 of the UE 115) may communicate with another UE 115 (e.g., the communication manager 103 of the UE 115) over a communication link 135, which may be or include a sidelink link.

The two sets of parameters may use uplink pathloss, sidelink pathloss, or a combination thereof. In some examples, the DCI may be an example of group common DCI that indicates the parameter set to use for each UE 115 of a set of UEs 115 or each resource of a set of resources. The group common DCI indication may be used for UEs 115 operating in mode 2 sidelink communications. These and other implementations are described further with respect to the following figures.

Figure 2:
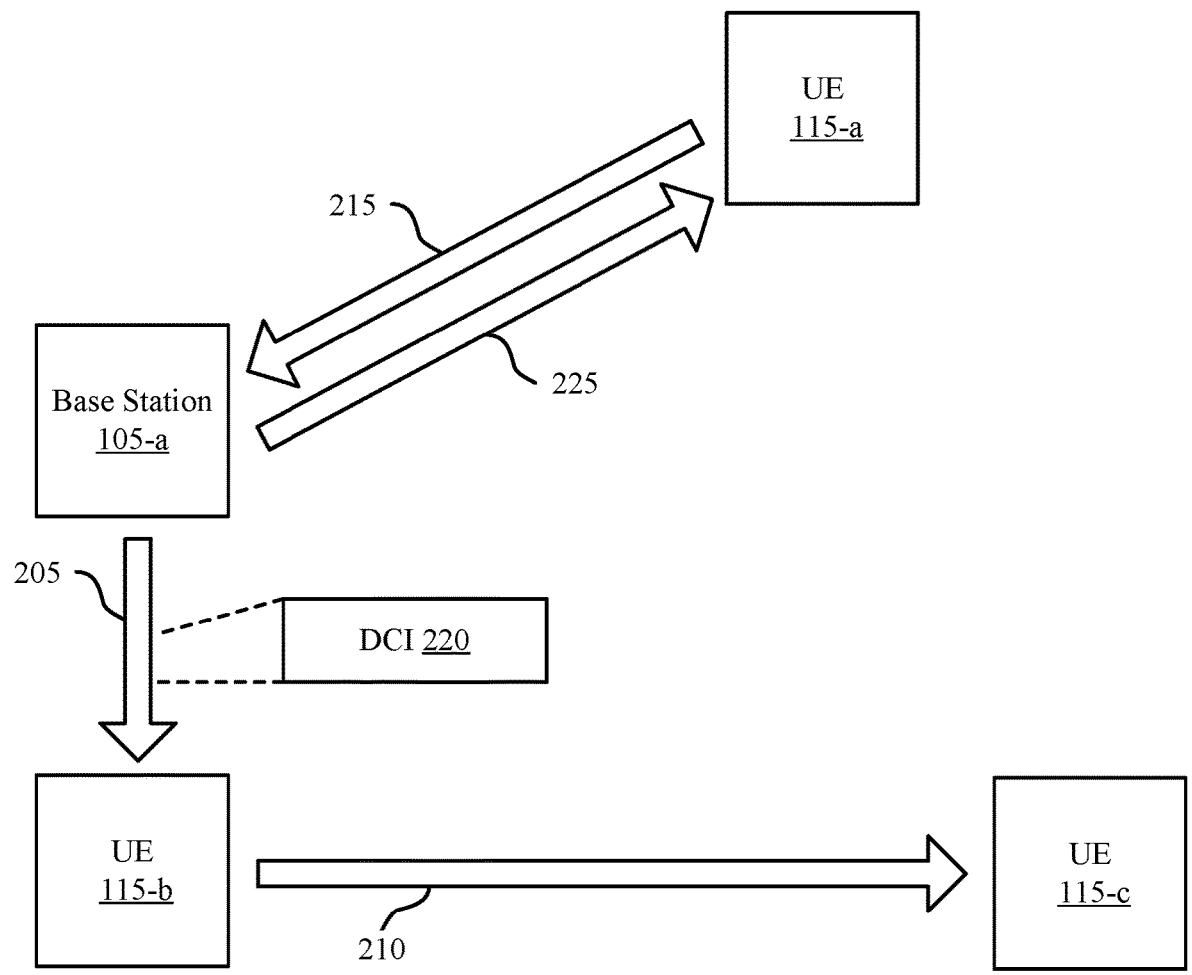
FIG. 2 illustrates an example of a wireless communications system that supports sidelink power control using shared resources in accordance with one or more aspects of the present disclosure.

FIG. 2 illustrates an example of a wireless communications system 200 that supports sidelink power control using shared resources in accordance with one or more aspects of the present disclosure. In some examples, wireless communications system 200 may implement aspects of wireless communications system 100. The wireless communications system 200 includes a base station 105-*a* and UEs 115-*a*, 115-*b*, and 115-*c*, which may be examples of the corresponding devices of FIG. 1. The base station 105-*a* may schedule various communications with the UEs 115, including uplink, downlink, and sidelink communications. Because the base station 105-*a* may schedule sidelink communications between UEs 115, the UEs 115 may perform sidelink communications in accordance with sidelink mode 1 operations.

One or more of the UEs 115 may be configured with sets of power control parameters for determining transmission powers for respective transmissions. As illustrated in FIG. 2, UE 115-*a* performs uplink communications over an uplink channel 215 (e.g., a physical uplink shared channel (PUSCH)). The uplink channel 215 may be scheduled by the base station 105-*a* (e.g., uplink configured grant) and may use one or more uplink resources. The uplink communications may be transmitted by the UE 115-*a* using a transmit power that is determined using a set of power control parameters and an open loop power control procedure. It should be understood that the uplink transmissions may be performed using a closed-loop power control procedure in some examples. In accordance with an open loop power control procedure, the UE 115-*a* may be configured with a parameter $P_0$, which may correspond to a target receive power at the base station. That is, the base station 105-*a* may configure the UE 115-*a* with the parameter $P_0$, which indicates that the base station 105-*a* is to receive a transmission by the UE 115-*a* with a receive power of $P_0$. In some cases, the parameter $P_0$ may be defined as: p0-DL-PSC-CHPSSCH. The UE 115-*a* may also be configured with a parameter α, which may represent a pathloss compensation component and may be referred to as alpha-DL-PSC-CHPSSCH. These parameters, in conjunction with a downlink pathloss ($PL_D$), may be used to calculate the uplink transmission power ($P_D$) by the UE 115-*a* as follows: $P_D = P_{0,D} + 10 \log_{10}(2^\mu \cdot M_{RB}(i)) + \alpha_D \cdot PL_D$.

One or more of the UEs 115 may also be configured with a set of power control parameters for sidelink communications. For example, the UE 115-*b* may be configured with $P_0$ and α for sidelink, which may have also been referred to as p0-SL-PSCCHPSSCH and alpha-SL-PSCCHPSSCH, respectfully. The sidelink transmission power may be determined as follows: $P_S = P_{0,S} + 10 \log_{10}(2^\mu \cdot M_{RB}(i)) + \alpha_S \cdot PL_S$.

A UE 115 may be configured to use downlink pathloss (e.g., between a UE 115 and base station 105-*a*), sidelink pathloss (e.g., between a transmitting UE 115-*b* and a receiving UE 115-*c*) or both downlink pathloss and sidelink pathloss for determining a transmit power. The pathloss may correspond to a distance between devices as well as other factors and may be based on a difference between a transmission power of a transmission and a receive power of the same transmission. The pathloss may be determined by the transmitting UE 115-*b* based on a transmission to the receiving UE 115-*b*. For example, for the downlink pathloss, the base station 105-*a* may transmit a transmission (e.g., reference signal) with a transmission power and the transmission may indicate the transmission power. The UE 115-*b* may receive the transmission, determine the received power (e.g., reference signal receive power (RSRP)), and determine the downlink pathloss based on the difference between the receive power and the indicated transmission power. A similar technique may be performed for sidelink. That is, the UE 115-*c* may transmit a transmission (e.g., reference signal) with a transmit power and indicate the transmit power in the transmission. The UE 115-*b* may receive the transmission, determine the received power (e.g., RSRP), and determine the sidelink pathloss based on the difference between the receive power and the indicated transmission power.

When parameters for both downlink pathloss and sidelink pathloss are configured at a UE 115, then the UE 115 may determine the minimum power values using the open loop power control equations based on the downlink pathloss and the sidelink pathloss as follows: $P = \min\{P_S, P_D\}$ for either an uplink transmission power or a sidelink transmission power. That is, the minimum function may be used to select the determined transmission power that is lower than the other (e.g., one of the determined transmission powers is less than the other transmission power). For example, if $P_S < P_D$, then the UE 115 may determine to use the transmission power, $P_S$, since it is lower or less than $P_D$. Similarly, if $P_D < P_S$, then the UE 115 may determine to use the transmission power, $P_D$, since it is lower or less than $P_S$.

For example, the uplink channel 215 and a sidelink channel 210, which may be scheduled by a DCI message 220 transmitted over a downlink channel 205, may share resources (e.g., overlapping time domain and/or frequency domain resources). Thus, when the UE 115-*b* is determining a transmit power for the sidelink channel 210, the UE 115-*b* may identify the minimum of the transmit powers determined using the uplink pathloss and respective parameters and the sidelink pathloss and respective parameters. As such, the UE 115-*b* may limit or reduce interference by communications on the sidelink channel 210 with communications on the uplink channel 215 and by the UE 115-*a*. However, in some cases, UE 115-*b* may be able to perform sidelink communications with a higher transmit power than the determined minimum.

According one or more examples described herein, for a resource pool, a UE 115-*b* may be configured with two sets of open loop power control parameters ($P_{0,D}^{(0)}$ and $P_{0,D}^{(1)}$) that are based on the downlink pathloss between the UE 115-*b* and the base station 105-*a*. One of the sets of power control parameters may be used when no UU transmission (e.g., base station 105-*a* and UE 115-*a* transmission) is scheduled on overlapping time or frequency resources of the sidelink channel between the UE 115-*b* and the UE 115-*c*. The other set(s) of power control parameters may be used when there are UU transmissions scheduled on overlapping time or frequency resources of the sidelink channel between the UE 115-*b* and the UE 115-*c*. The DCI message 220 may include an indication (e.g., a bit flag or field) of which set of power control parameters that the UE 115-*b* is to use when determining the sidelink transmit power. Thus, if the uplink channel 215 includes resources that at least partially overlap with the sidelink channel 210, then the DCI message 220 may indicate the second set of parameters, and if the resources do not at least partially overlap, then the DCI message 220 may indicate the first set of parameters. The parameter sets may include $P_0$ or both $P_0$ and α.

To include the indication, the DCI message 220 may include a field that contains the sidelink grant from the base station 105-*a* (e.g., DCI format 3_0 or new DCI format 3_x) to indicate whether the sidelink transmitting UE (e.g., UE 115-*b*) is to use the first $P_0$ (and α) or the second $P_0$ (and α) values for the power control determination. In some cases, the UE 115-*b* may be configured with a plurality of sets of open loop power control parameters for a set of priority levels, and the transmitting UE 115-*b* may select a set of open loop power control parameters from a corresponding plurality of sets of $P_0$ values based on the priority of the packet (e.g., sidelink message) scheduled for transmission on the sidelink channel as well as the indication included in the DCI message 220. That is, the UE 115-*b* may be configured with a first set of parameters that is associated with a first priority may include subsets A (with $P_0$ or both $P_0$ and α values) and B (with $P_0$ or both $P_0$ and α values) and a second set of parameters that is associated with a second priority that includes subsets A and B. The priority of the packet scheduled for transmission may indicate which set (e.g., first or second set) that the UE 115-*b* is to select from, and the indication in the DCI message 220 may indicate which of the subsets to select (A or B).

According to another technique, the UE 115-*b* may be configured with one set of open loop power control parameters based on downlink pathloss and another set of power control parameters based on sidelink pathloss. In accordance with this technique, the base station 105-*b* may indicate, via the DCI message 220 that carries the sidelink grant, whether the UE is to use the sidelink pathloss (e.g., the sidelink power control parameters) or both the downlink and the sidelink pathloss. In the second case (e.g., using both the downlink and sidelink pathloss parameters), the UE 115-*b* may identify the minimum transmission power of both equations, as described above. Thus, if no UU transmission is scheduled on the same time or frequency resources as the sidelink channel 210, then the sidelink transmitting UE 115-*b* may use the sidelink pathloss to determine the transmit power (e.g., $P=P_S$). Otherwise, if there is a UU transmission scheduled on the same time/frequency resources as the sidelink transmission, then the UE may use both the sidelink and the downlink pathloss to determine the transmission power (e.g., $P=\min(P_S, P_D)$). That is, the UE 115 may select the lower transmission power of the two transmission powers $P_S$, $P_D$ as described herein.

In accordance with another technique, the UE 115-*b* may be configured with two or more sets of open loop power control parameters that are based on sidelink pathloss. In such cases, the DCI message 220 may include a field that indicates whether the sidelink UE 115-*b* is to use a first set of open low power control parameters or a second sets of open loop power control parameters to determine the sidelink transmission power. This technique may be used when the base station 105-*a* is limiting interference by uplink communications by other UEs, such as transmission by UE 115-*a* on the uplink channel 215, with sidelink communications. That is, if the uplink channel 215 includes resources that at least partially overlap with the sidelink channel 210, then the base station 105-*a* may indicate that the UE 115-*b* is to use the parameters that result in a higher transmit power (e.g., to prioritize the sidelink communications over the uplink communications by the UE 115-*a*). Thus, the base station may select the parameters that result in a transmission power that has a greater value than the transmission power determined using the other set of parameters. In some cases, a sidelink channel 210 may be allocated with resources that overlap with resources of a downlink channel 225. In this case, the base station may indicate that the UE 115-*b* is to use the parameters that may result in a higher transmit power in order to limit a transmission on the downlink channel 225 interfering with the sidelink transmission by the base station 105-*b* to the UE 115-*c*.

The UE 115-*b* may be configured with the power control parameters using control signaling. For example, the base station 105-*a* may transmit a radio resource control signal that indicates the values for the sets of power control parameters. In another example, the base station 105-*a* may transmit a DCI signal that indicates the values for the power control parameters. In some examples, the configuration message indicates priorities associated with the sets of power control parameters. As discussed above, the sets of power control parameters may include a $P_0$ value or both $P_0$ and α values. In some examples, the UE 115-*b* is configured with a $P_0$ value and one or more offset values (e.g., −X db or +X db) that indicate other $P_0$ values for the other parameter sets relative to the $P_0$ baseline value.

Figure 3:
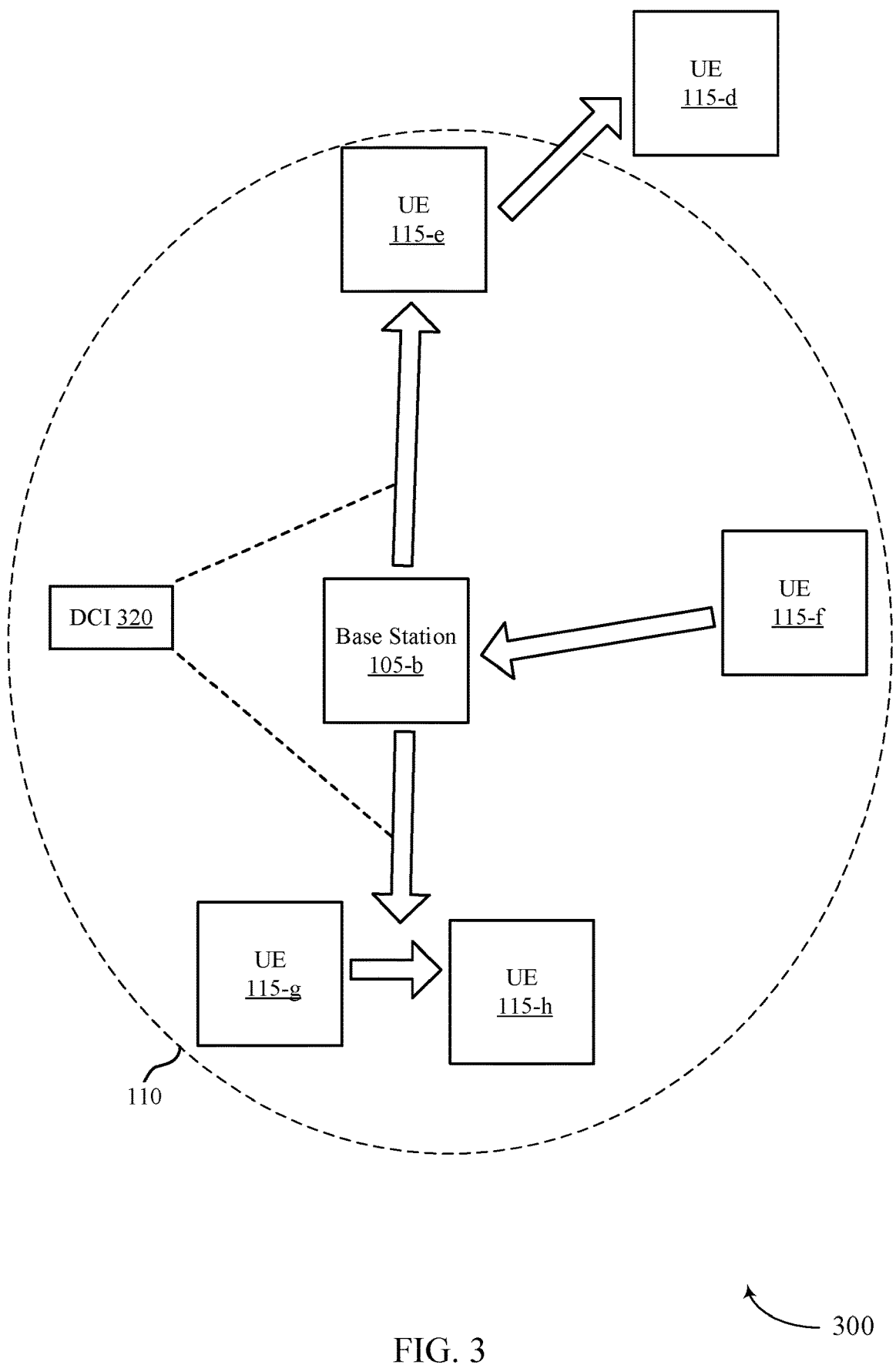
FIG. 3 illustrates an example of a wireless communications system that supports sidelink power control using shared resources in accordance with one or more aspects of the present disclosure.

FIG. 3 illustrates an example of a wireless communications system 300 that supports sidelink power control using shared resources in accordance with one or more aspects of the present disclosure. In some examples, wireless communications system 300 may implement aspects of wireless communications system 100. The wireless communications system 300 includes a base station 105-*b* and UEs 115-*d*, 115-*e*, 115-*f*, 115-*g*, and 115-*h*, which may be examples of the corresponding devices as described with respect to FIGS. 1 and 2. The base station 105-*b* may schedule various uplink, downlink, and sidelink communications with the various UEs 115. As discussed herein, the UEs 115 may be configured with two or more sets of power control parameters that may be used to determine a transmission power for various transmissions.

In FIG. 3, a group common DCI 320 may indicate power control parameters that one or more of the UEs 115 is to use for determining a transmit power for a sidelink communication. The group common DCI 320 may indicate the parameters to be used by a sidelink transmission UEs (e.g., UEs 115-*e* and UE 115-*g*) on a resource basis or a UE basis. On a resource basis, the group common DCI 320 may indicate the parameter set to use per resource of a set of resources. For example, the UE 115-*g* may identify which sidelink resource is to be used for the sidelink transmission to the UE 115-*h*. The UE 115-*g* may also identify the indication in the group common DCI 320 that corresponds to the identified resources. Based on the indication, the UE 115-*g* may determine the transmit power. In some examples, the sidelink receiving UE 115-*h* may also receive the group common DCI 320. The sidelink receiving UE 115-*h* may determine that the sidelink transmitting UE 115-*g* is to use a particular set of power control parameters based on the group common DCI 320 for transmitting a sidelink message to the sidelink receiving UE 115-*h*.

On a UE 115 basis for the group common DCI 320, the group common DCI 320 may indicate the parameter set to use per UE of a set of UEs 115. Thus, if UE 115-*g* is scheduled for a sidelink transmission, the UE 115-*g* may identify the DCI indication that corresponds to the UE 115-*g* (e.g., based on a UE identifier), and determine the transmit power based on the indication. The group common DCI technique may be used when the UEs 115 are performing mode 2 sidelink communications. In such cases, the base station 105-*b* may not manage the sidelink communications and may not be aware of whether any transmissions are to occur. As such, the base station 105-*b* may perform power boosting or de-boosting (e.g., based on an indicated parameter set) based on UU resources (e.g., uplink or downlink) that the base station 105-*b* has scheduled or is scheduling.

When a sidelink UE (e.g., UE 115-*g*) is transmitting in according to a configured grant (e.g., no dynamic DCI indicate that the sidelink resources), then the group common DCI 320 may be useful to manage power control and interference. For configured grant, a sidelink UE 115 may be configured with multiple sets of open loop power control parameters for each configured grant, and the selection of the open loop power control parameters is based on the parameters configured for the particular configured grant. If one set of power control parameters is configured at the UE 115, then the UE 115 may ignore the indication in the group common DCI 320.

Figure 4:
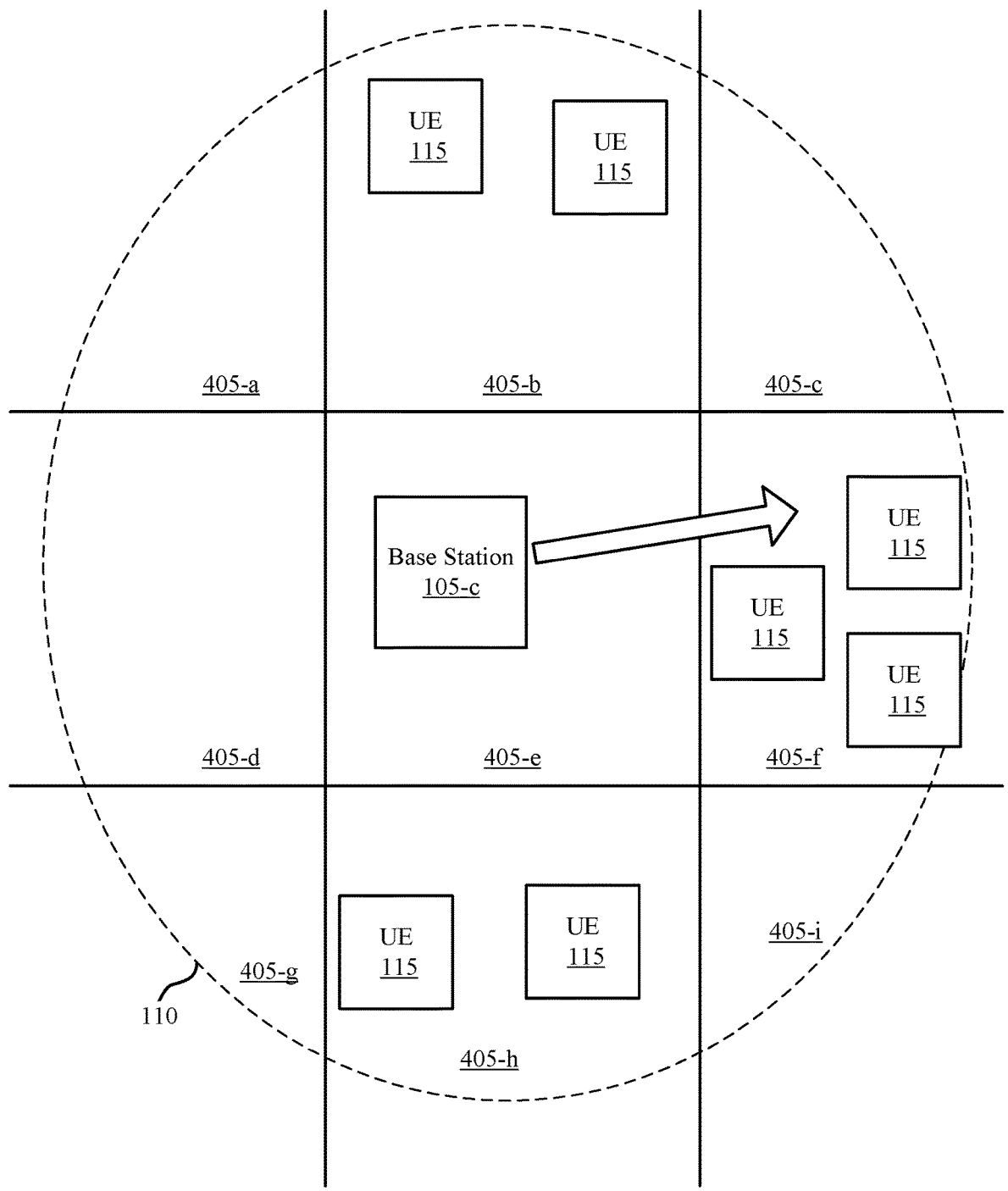
FIG. 4 illustrates an example of a wireless communications system that supports sidelink power control using shared resources in accordance with one or more aspects of the present disclosure.

FIG. 4 illustrates an example of a wireless communications system 400 that supports sidelink power control using shared resources in accordance with one or more aspects of the present disclosure. In some examples, wireless communications system 400 may implement aspects of wireless communications system 100. The wireless communications system 400 includes a base station 105-*c* and UEs 115, which may be examples of the corresponding devices as described with respect to FIGS. 1 through 3. The base station 105-*c* may schedule various uplink, downlink, and sidelink communications with the various UEs 115. As discussed herein, the UEs 115 may be configured with two or more sets of power control parameters that may be used to determine a transmission power for various transmissions. The parameter sets may be configured per resource pool.

For more granular power control, the base station 105-c may configure the sets of power control parameters per zone per resource pool. As illustrated in FIG. 4, a coverage area 110 of the base station 105-c may be separated into a plurality of zones 405. A UE may be located in a particular zone 405 based on the geographic information (e.g., global positioning system (GPS) information) associated with the UE 115. UEs 115 in different zone may utilize different power control parameter sets. Further, the corresponding zone may depend on a sidelink transmitting UE 115 or a sidelink receiving UE 115.

The base station 105-c may estimate the UU (e.g., uplink and downlink) activities in some zones 405. As such, the base station 105-c may configure smaller or larger open loop power control values (e.g., $P_0$) based on the UU activity in the area. The base station 105-c may semi-statically adapt the open loop power control parameters based on the activities in a given zone 405. The base station 105-c may indicate (e.g., via DCI) a set of a parameters that a UE 115 is to use for sidelink transmission power determination based on the activity within the zone 405 corresponding to the UE 115.

Figure 5:
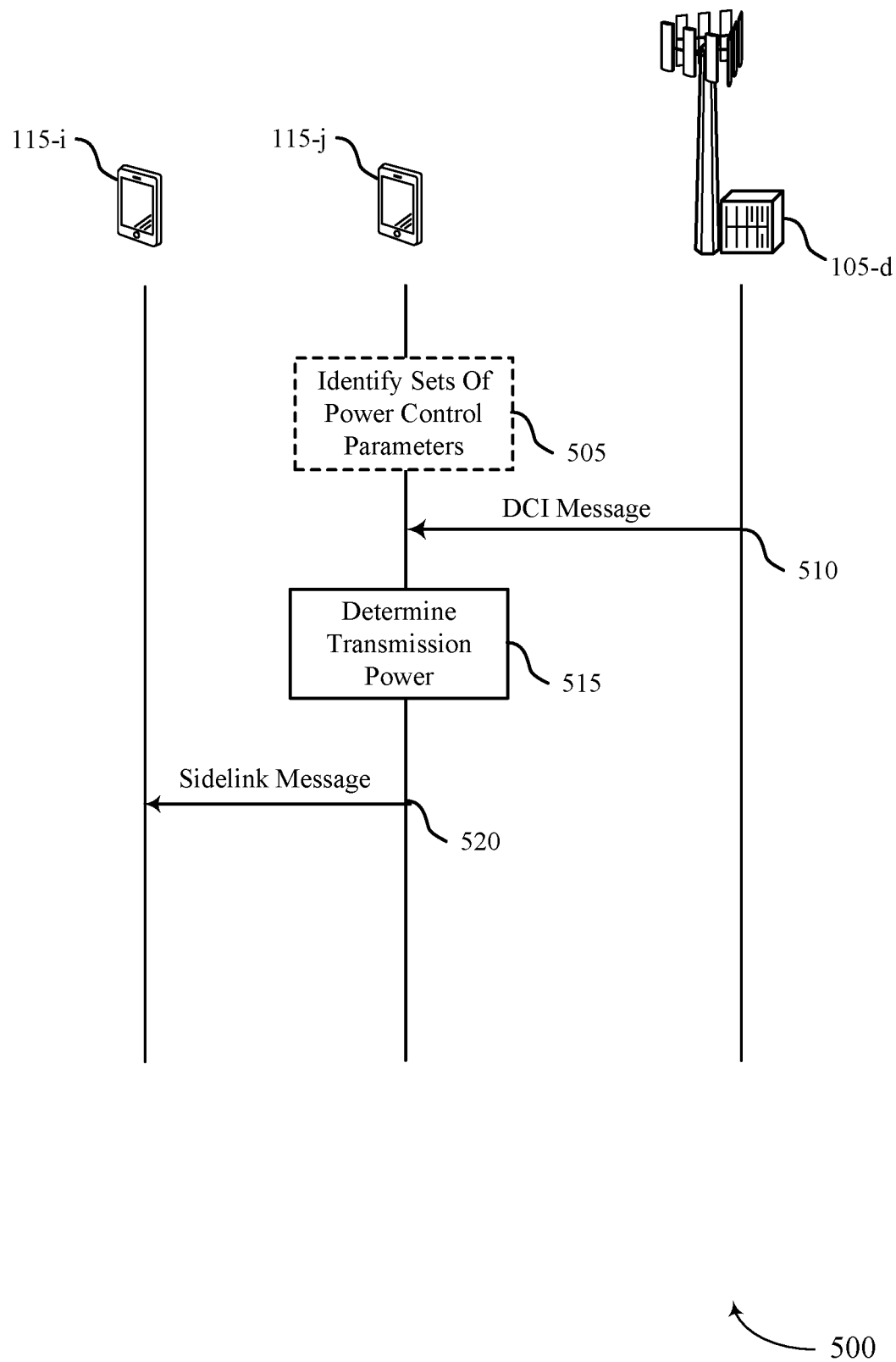
FIG. 5 illustrates an example of a process flow diagram that supports sidelink power control using shared resources in accordance with one or more aspects of the present disclosure.

FIG. 5 illustrates an example of a process flow diagram 500 that supports sidelink power control using shared resources in accordance with one or more aspects of the present disclosure. In some examples, process flow diagram 500 may implement aspects of wireless communications system 100. The process flow includes a base station 105-d and UEs 115-i and 115-j, which may be examples of the corresponding devices as described with respect to FIGS. 1 through 4. The UE 115-j may be an example of a sidelink transmitting UE and the UE 115-i may be an example of a sidelink receiving UE.

At 505, the UE 115-j may identify a first set of power control parameters and a second set of power control parameter. The first set and the second set of power control parameters may both correspond to a downlink pathloss between the UE 115-j and the base station 105-d, may both correspond to a sidelink pathloss between the UE 115-j and the UE 115-i, or one may correspond to the downlink pathloss and the other to the sidelink pathloss. The sets of power control parameters may be identified based on a control signal (e.g., DCI message or RRC signal) transmitted by the base station 105-d to the UE 115-j. In some examples, the UE 115-j may be configured with additional sets of parameters that are associated with different priorities.

At 510, the UE 115-j receives, from the base station 105-d, a DCI message that includes an indication to use one or both of the first set of power control parameters and the second set of power control parameters for a sidelink message. If both sets correspond to the uplink pathloss, then the indication may specify one of the parameters to use. If one set of parameters corresponds to the downlink pathloss and the other set to the sidelink pathloss, then the indication may specify to use either the parameters corresponding to the sidelink pathloss or the minimum transmission power determined using both sets. If both sets of parameters correspond to the sidelink pathloss, then the DCI may specify which set to use. The base station 105-b may identify the set based on whether UU transmissions are scheduled on resources that may overlap with the sidelink transmissions. In some examples, the DCI message is included in a group common DCI that includes the indication per resource or per UE (e.g., using a RNTI). In some examples, the DCI may schedule at least one resource for the sidelink message. In cases where the DCI message is a group common DCI, the UE 115-i may also receive the indication that the UE 115-j is to use one or both sets of power control parameters for sidelink transmission power.

At 515, the UE 115-j may determine the transmission power for the sidelink message based at least in part on the indication include in the DCI. That is, the UE 115-j may apply the indication parameter set, which may include a $P_0$ value or both a $P_0$ value and an a value, and a corresponding pathloss, to the respective formula to determine the transmit power. In some examples, the second set of power control parameters are identified based on an offset relative to the values for the first set of power control parameters. In some cases, the power control parameters are identified based on a priority associated with the sidelink message (e.g., indicated via DCI). In some examples, the set of power control parameters are configured at the UE 115-j by the base station 105-d relative to a geographical zone, and the UE 115-j may determine a geographical zone in which the UE 115-j or the UE 115-i is located. The UE 115-j may identify the first set of power control parameters and the second set of power control parameters based at least in part on the identified geographical zone.

At 520, the UE 115-j may transmit, to the second UE 115-i, the sidelink message using a transmission power that is determined based at least in part on the indication to use one or both of the first set of power control parameters and the second set of power control parameters.

Figure 6:
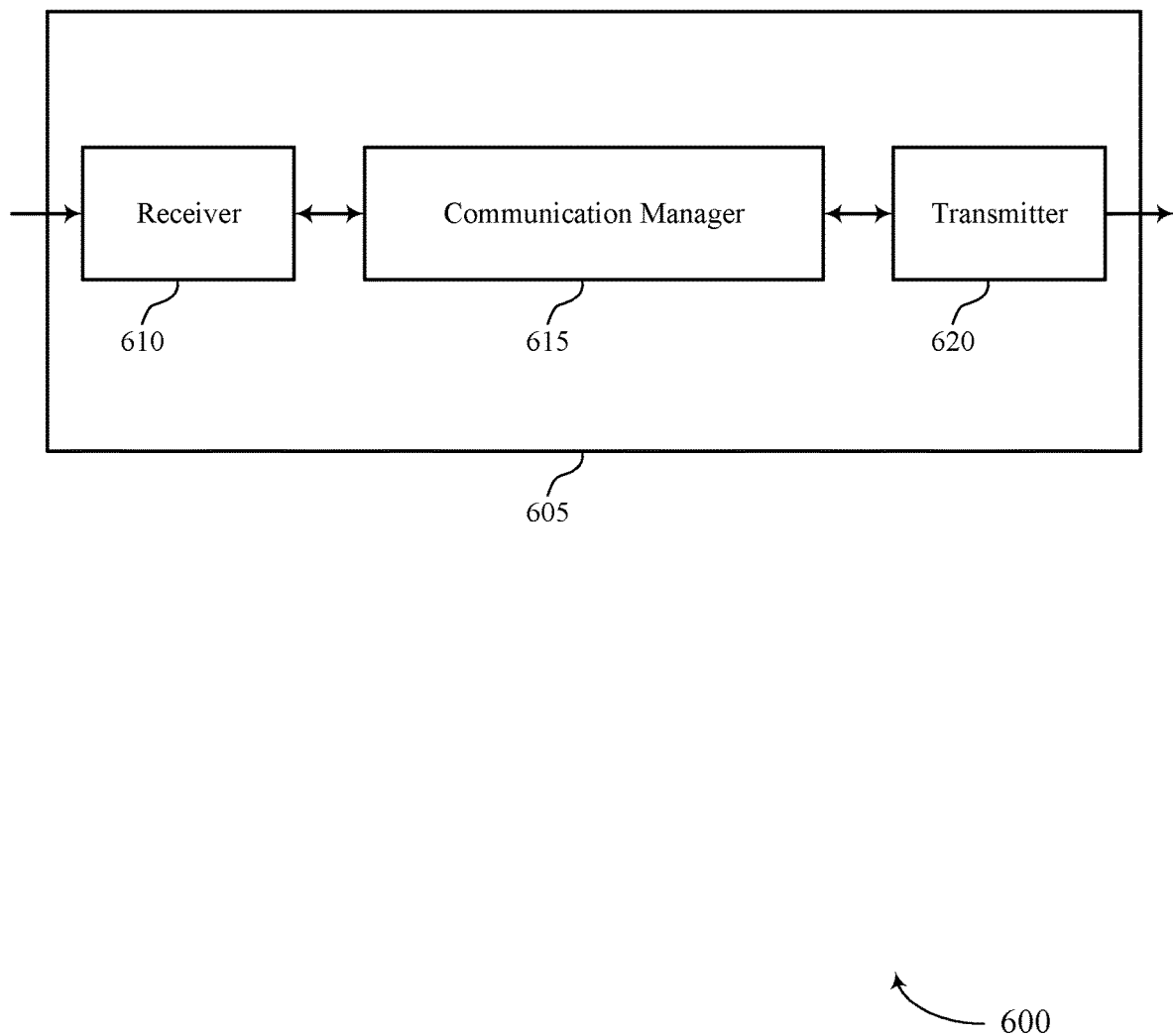
FIGS. 6 and 7 show block diagrams of devices that support sidelink power control using shared resources in accordance with one or more aspects of the present disclosure.

FIG. 6 shows a block diagram 600 of a device 605 that supports sidelink power control using shared resources in accordance with one or more aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink power control using shared resources, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may identify, at the first UE, a first set of power control parameters and a second set of power control parameters, receive, from a base station, a DCI message that includes an indication to use one or both of the first set of power control parameters and the second set of power control parameters for a sidelink message, and transmit, to a second UE, the sidelink message using a transmission power that is determined based on the indication to use one or both of the first set of power control parameters and the second set of power control parameters. The communication manager 615 may be an example of aspects of the communication manager 910 described herein.

The communication manager 615 may be an example of means for performing various aspects of sidelink power control described herein. The communication manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communication manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device.

In some examples, the communication manager 615 may be configured to perform various operations (e.g., receiving, transmitting, receiving) using or otherwise in cooperation with the receiver 610, the transmitter 620, or both.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

In some examples, the communication manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communication manager 615 as described herein may be implemented to allow the device 605 to more determine transmission powers for sidelink communication to support more efficient sidelink transmissions between the device 605 and another device, and more specifically to determine a transmit power based on a DCI message received from a base station. For example, the device 605 may identify a transmit power to use for transmitting a sidelink transmission, based on a received DCI message that indicates a power control parameter set to use for determining the transmission power.

Based on implementing the sidelink transmission power techniques as described herein, a processor of a UE 115 (e.g., controlling the receiver 610, the transmitter 620, or the transceiver 920 as described with reference to FIG. 9) may increase reliability and decrease signaling overhead in sidelink, because the sidelink may be transmitted using an adequate transmission power.

Figure 7:
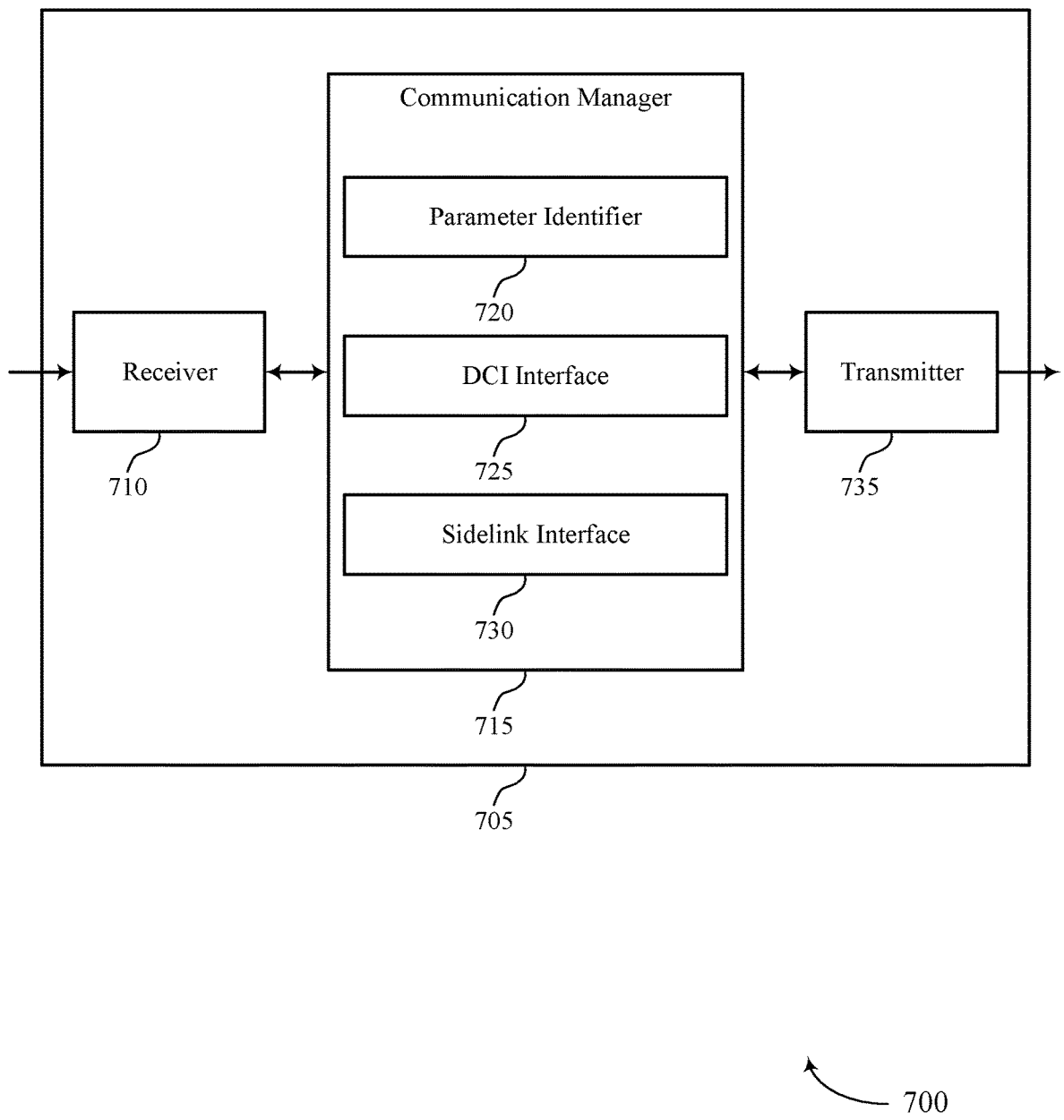

FIG. 7 shows a block diagram 700 of a device 705 that supports sidelink power control using shared resources in accordance with one or more aspects of the present disclosure. The device 705 may be an example of aspects of a device 605, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to sidelink power control using shared resources, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a parameter identifier 720, a DCI interface 725, and a sidelink interface 730. The communication manager 715 may be an example of aspects of the communication manager 910 described herein.

The parameter identifier 720 may identify, at the first UE, a first set of power control parameters and a second set of power control parameters.

The sidelink interface 730 may transmit, to a second UE, the sidelink message using a transmission power that is determined based on the indication to use one or both of the first set of power control parameters and the second set of power control parameters.

The DCI interface 725 may receive, from a base station, a DCI message that includes an indication to use one or both of the first set of power control parameters and the second set of power control parameters for a sidelink message.

The transmitter 735 may transmit signals generated by other components of the device 705. In some examples, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

Figure 8:
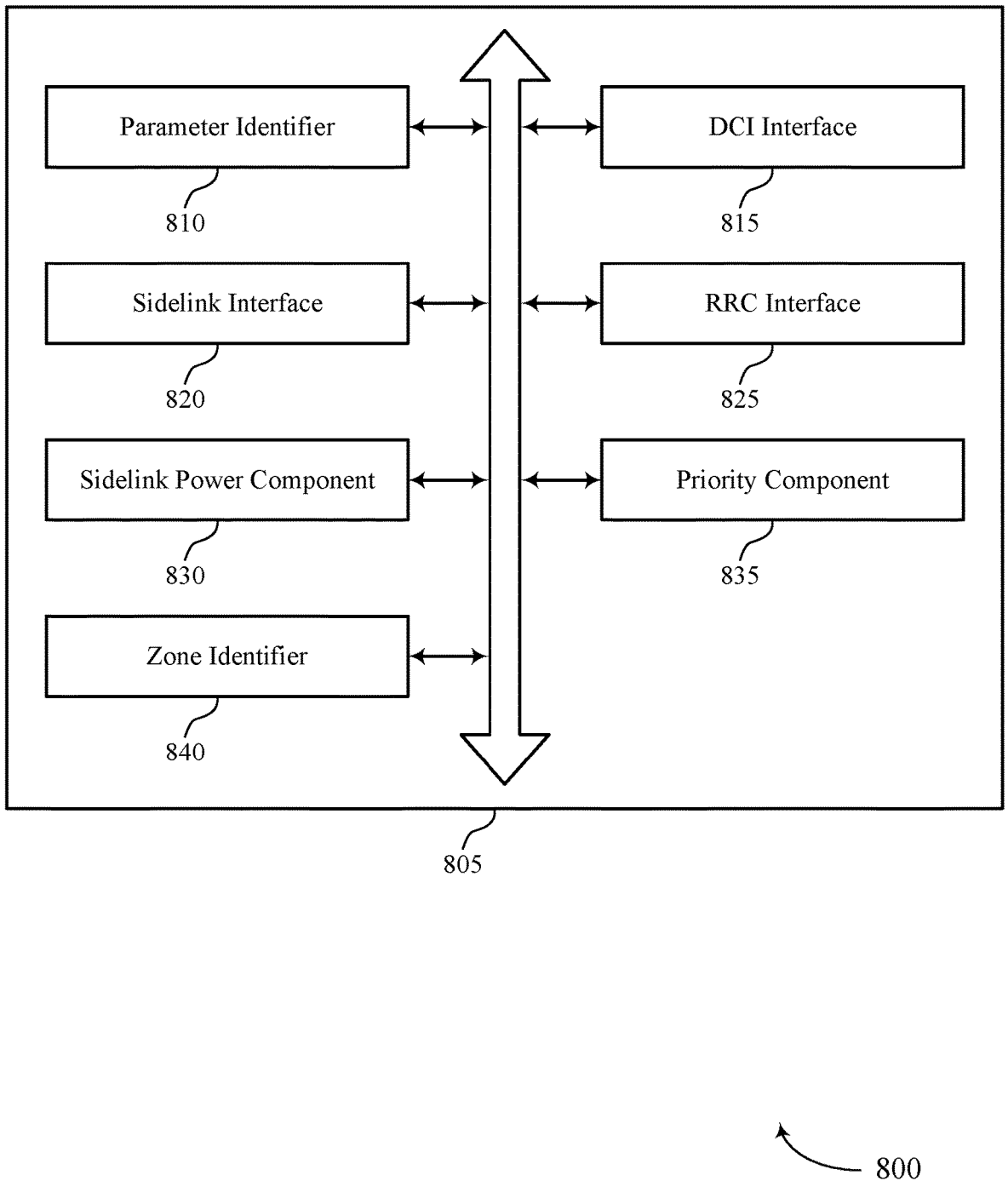
FIG. 8 shows a block diagram of a communication manager that supports sidelink power control using shared resources in accordance with one or more aspects of the present disclosure.

FIG. 8 shows a block diagram 800 of a communication manager 805 that supports sidelink power control using shared resources in accordance with one or more aspects of the present disclosure. The communication manager 805 may be an example of aspects of a communication manager 615, a communication manager 715, or a communication manager 910 described herein. The communication manager 805 may include a parameter identifier 810, a DCI interface 815, a sidelink interface 820, a RRC interface 825, a sidelink power component 830, a priority component 835, and a zone identifier 840. Each of these modules may communicate, directly or indirectly, with one another (e.g., via one or more buses).

The parameter identifier 810 may identify, at the first UE, a first set of power control parameters and a second set of power control parameters.

In some examples, the parameter identifier 810 may identify a value for a target receive power and a value for a pathloss compensation component for the first set of power control parameters and the second set of power control parameters.

In some examples, the parameter identifier 810 may identify a value for a target receive power for the first set of power control parameters and the second set of power control parameters.

In some examples, the parameter identifier 810 may identify a value for a target receive power for the first set of power control parameters and an offset value.

In some examples, the parameter identifier 810 may identify a value for a target receive power for the second set of power control parameters based on the value for the target receive power for the first set of power control parameters and the offset value.

In some examples, the parameter identifier 810 may identify the first set of power control parameters and the second set of power control parameters based on the first priority.

In some examples, the parameter identifier 810 may identify the first set of power control parameters and the second set of power control parameters based on the identified geographical zone.

The DCI interface 815 may receive, from a base station, a DCI message that includes an indication to use one or both of the first set of power control parameters and the second set of power control parameters for a sidelink message.

In some examples, the DCI interface 815 may receive the DCI message that includes a field with the indication to use one or both of the first set of power control parameters or the second set of power control parameters, where the sidelink message is transmitted using the transmission power determined in accordance with a value included in the field.

In some examples, the DCI interface 815 may receive the DCI message that schedules at least one resource for the sidelink message to be transmitted to the second UE.

In some examples, the DCI interface 815 may receive the DCI message in a group common DCI message that includes the indication for each resource of a set of resources, where the transmission power is determined based in least in part on a resource used for transmission of the sidelink message.

In some examples, the DCI interface 815 may receive the DCI message in a group common DCI message that includes the indication for each UE of a set of UEs, where the transmission power is determined based on the indication that corresponds to the first UE.

In some examples, the DCI interface 815 may receive a control signal that indicates sets of parameters to utilize per geographical zone of a set of geographical zones. In some cases, the field includes a bit flag.

In some examples, the DCI interface 815 may transmit, to the first UE, an indication of a radio network temporary identifier that corresponds to a group common DCI message, and transmit the group common DCI that is scrambled by the radio network temporary identifier and includes the indication.

The sidelink interface 820 may transmit, to a second UE, the sidelink message using a transmission power that is determined based on the indication to use one or both of the first set of power control parameters and the second set of power control parameters.

In some examples, the sidelink interface 820 may transmit the sidelink message using the transmission power that is determined based on the first set of power control parameters or the second set of power control parameters in accordance with the indication.

In some examples, the sidelink interface 820 may transmit the sidelink message using the transmission power that is determined based on the second set of power control parameters in accordance with the indication. In some examples, the sidelink interface 820 may transmit the sidelink message using the lower transmission power based at least in part on determining that the DCI message includes the indication to use both the first set of power control parameters and the second set of power control parameters.

In some examples, the sidelink interface 820 may transmit the sidelink message using the transmission power that is determined based on the first set of power control parameters or the second set of power control parameters in accordance with the indication.

The RRC interface 825 may receive, from the base station, a radio resource control signal or the DCI message that indicates the first set of power control parameters and the second set of power control parameters.

The sidelink power component 830 may determine that the DCI message includes the indication to use either the first set of power control parameters or the second set of power control parameters, where both the first set of power control parameters and the second set of power control parameters are associated with a downlink pathloss from the base station to the first UE.

In some examples, the sidelink power component 830 may determine that the DCI message includes the indication to use the second set of power control parameters for the sidelink message, where the first set of power control parameters is associated with a downlink pathloss from the base station to the first UE and the second set of power control parameters is associated with a sidelink pathloss between the first UE and the second UE.

In some examples, the sidelink power component 830 may determine that the DCI message includes the indication to use both the first set of power control parameters and the second set of power control parameters for the sidelink message, where the first set of power control parameters is associated with a downlink pathloss from the base station to the first UE and the second set of power control parameters is associated with a sidelink pathloss between the first UE and the second UE.

In some examples, the sidelink power component 830 may identify a lower transmission power of a first transmission power determined using the first set of power control parameters and a second transmission power determined using the second set of power control parameters.

In some examples, the sidelink power component 830 may determine that the DCI message includes the indication to use either the first set of power control parameters or the second set of power control parameters, where both the first set of power control parameters and the second set of power control parameters are associated with a sidelink pathloss between the first UE and the second UE.

The priority component 835 may determine that the sidelink message is associated with a first priority. The zone identifier 840 may identify a geographical zone in which the first UE or the second UE is positioned.

Figure 9:
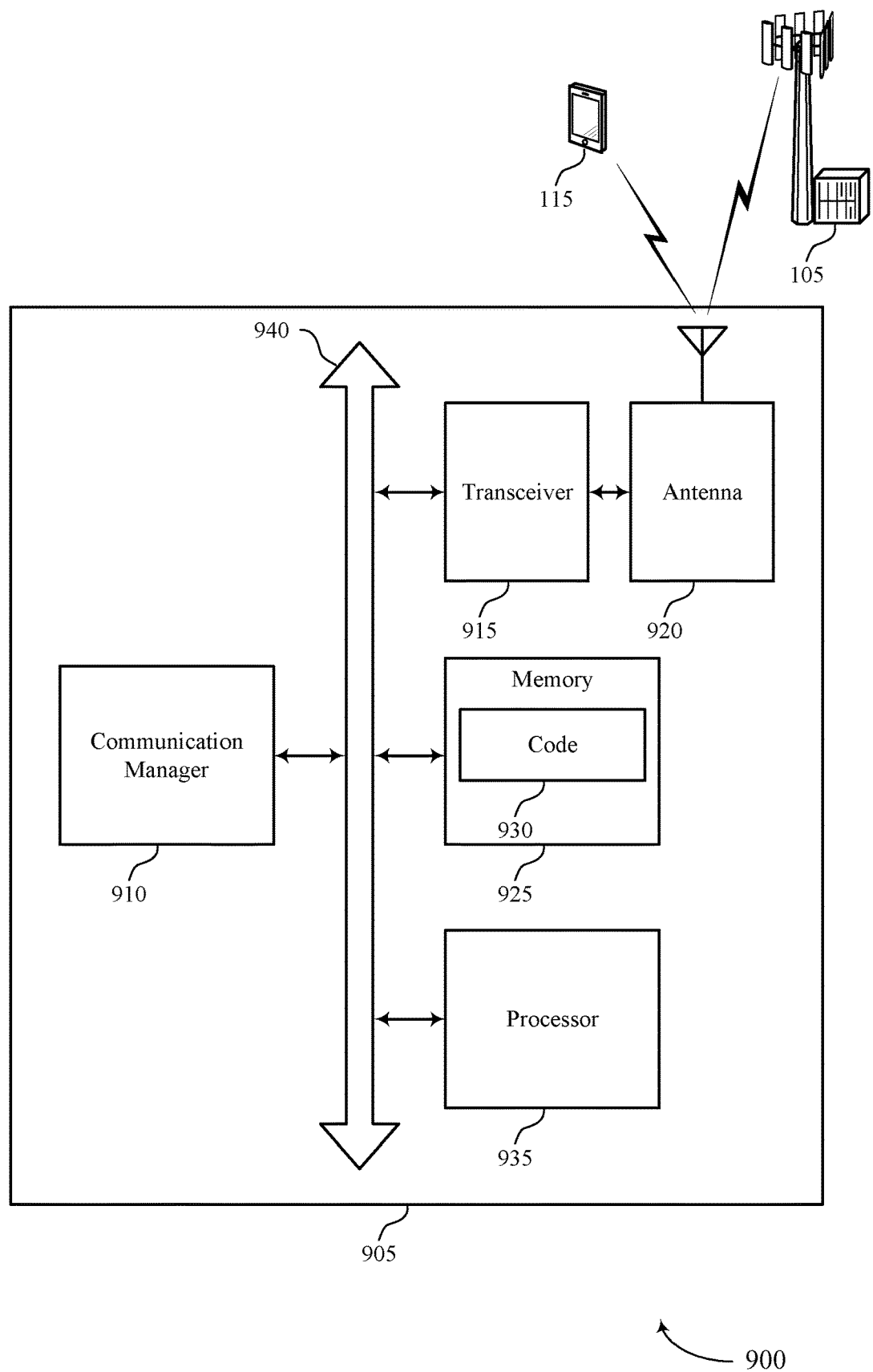
FIG. 9 shows a diagram of a system including a device that supports sidelink power control using shared resources in accordance with one or more aspects of the present disclosure.

FIG. 9 shows a diagram of a system 900 including a device 905 that supports sidelink power control using shared resources in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may identify, at the first UE, a first set of power control parameters and a second set of power control parameters, receive, from a base station, a DCI message that includes an indication to use one or both of the first set of power control parameters and the second set of power control parameters for a sidelink message, and transmit, to a second UE, the sidelink message using a transmission power that is determined based on the indication to use one or both of the first set of power control parameters and the second set of power control parameters.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communication. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting sidelink power control using shared resources).

Figure 10:
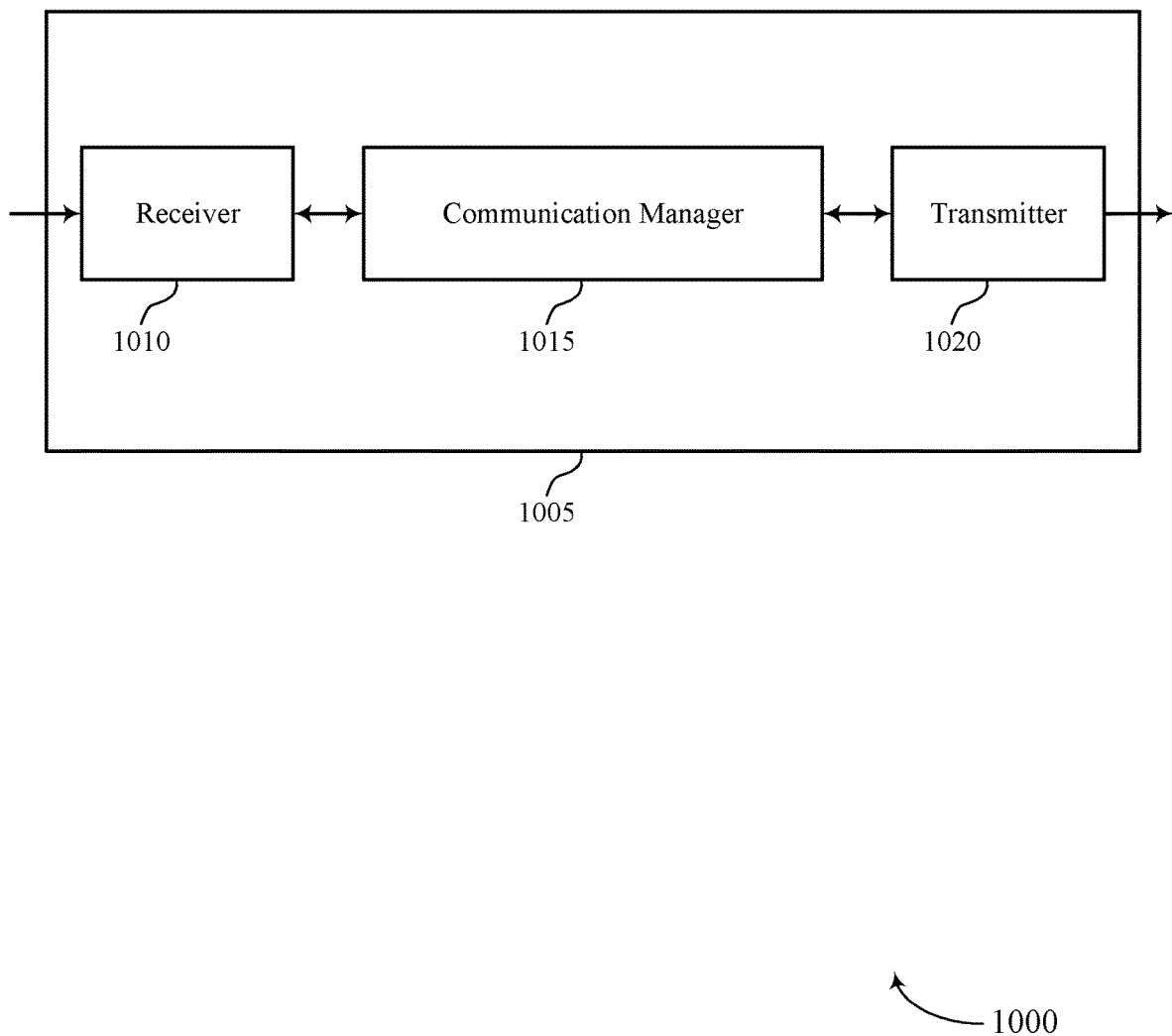
FIGS. 10 and 11 show block diagrams of devices that support sidelink power control using shared resources in accordance with one or more aspects of the present disclosure.

FIG. 10 shows a block diagram 1000 of a device 1005 that supports sidelink power control using shared resources in accordance with one or more aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink power control using shared resources, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may determine, that a first UE is configured with a first set of power control parameters and a second set of power control parameters, determine at least one first resource for a communication with a second UE, transmit, to the first UE, a DCI message that includes an indication to use one or both of the first set of power control parameters and the second set of power control parameters for a sidelink message based on the at least one resource for the communication with the second UE, and communicate with the second UE using the at least one resource. The communication manager 1015 may be an example of aspects of the communication manager 1310 described herein.

The communication manager 1015 may be an example of means for performing various aspects of managing sidelink power control as described herein. The communication manager 1015, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communication manager 1015, or its sub-components, may be implemented in code (e.g., as communications management software or firmware) executed by a processor, or any combination thereof. If implemented in code executed by a processor, the functions of the communication manager 1015, or its sub-components may be executed by a general-purpose processor, a digital signal processor (DSP), an application-specific integrated circuit (ASIC), a field programmable gate array (FPGA) or other programmable logic device.

In some examples, the communication manager 1015 may be configured to perform various operations (e.g., transmitting, communicating) using or otherwise in cooperation with the receiver 1010, the transmitter 1020, or both.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
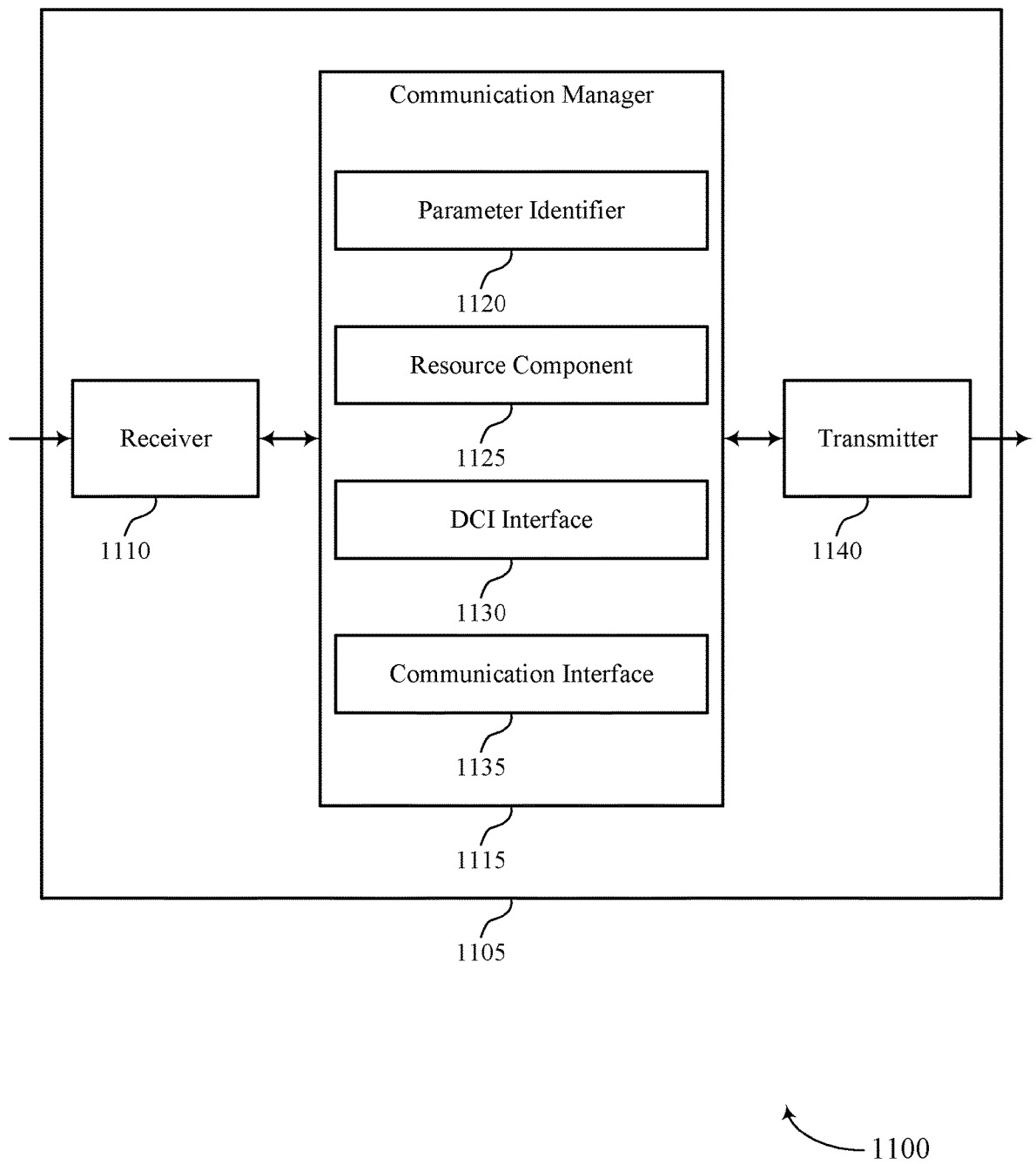

FIG. 11 shows a block diagram 1100 of a device 1105 that supports sidelink power control using shared resources in accordance with one or more aspects of the present disclosure. The device 1105 may be an example of aspects of a device 1005, or a base station 105 as described herein. The device 1105 may include a receiver 1110, a communication manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink power control using shared resources, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a parameter identifier 1120, a resource component 1125, a DCI interface 1130, and a communication interface 1135. The communication manager 1115 may be an example of aspects of the communication manager 1310 described herein.

The parameter identifier 1120 may determine, that a first UE is configured with a first set of power control parameters and a second set of power control parameters. The communication interface 1135 may communicate with the second UE using the at least one resource. The resource component 1125 may determine at least one first resource for a communication with a second UE.

The DCI interface 1130 may transmit, to the first UE, a DCI message that includes an indication to use one or both of the first set of power control parameters and the second set of power control parameters for a sidelink message based on the at least one resource for the communication with the second UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
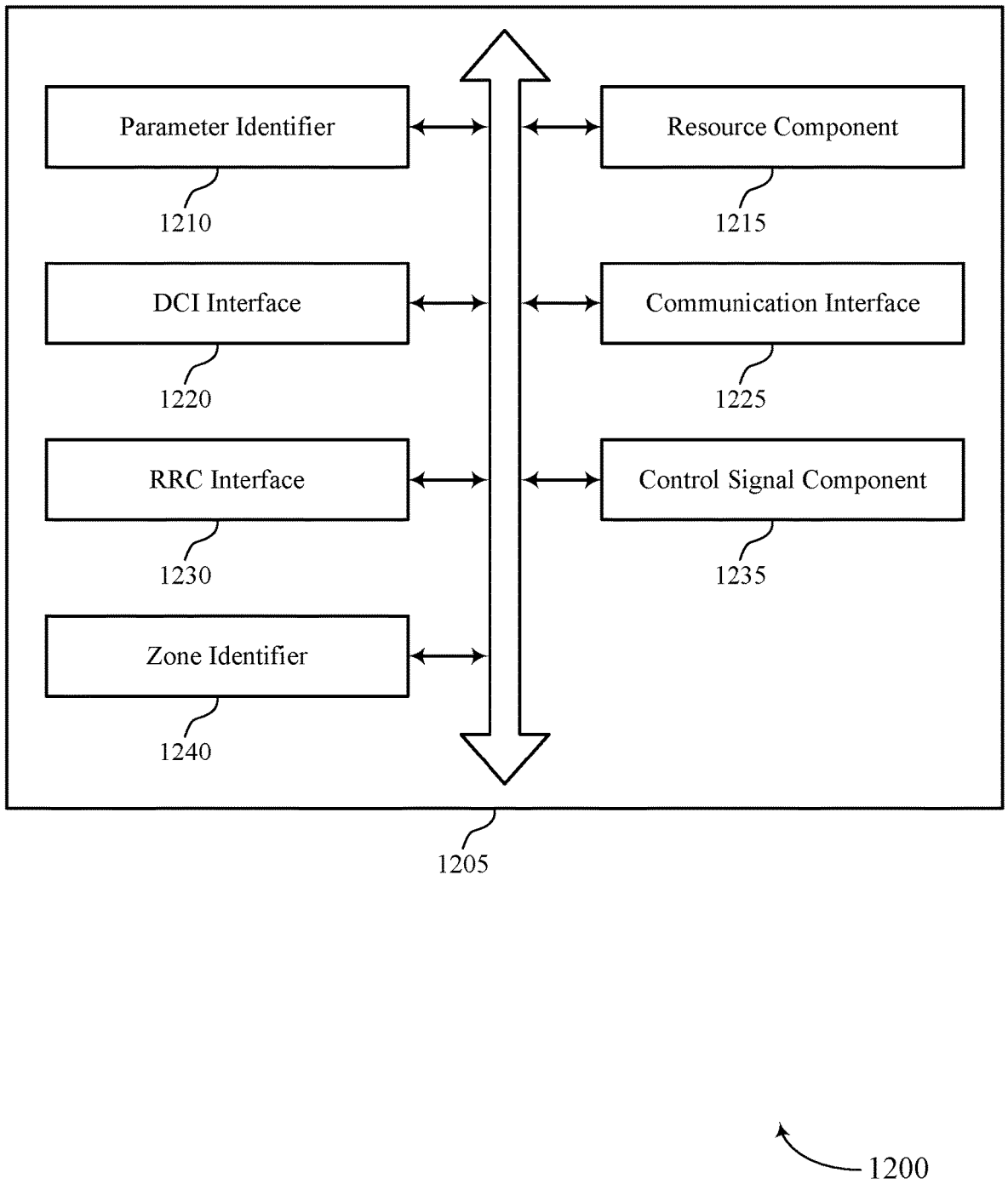
FIG. 12 shows a block diagram of a communication manager that supports sidelink power control using shared resources in accordance with one or more aspects of the present disclosure.

FIG. 12 shows a block diagram 1200 of a communication manager 1205 that supports sidelink power control using shared resources in accordance with one or more aspects of the present disclosure. The communication manager 1205 may be an example of aspects of a communication manager 1015, a communication manager 1115, or a communication manager 1310 described herein. The communication manager 1205 may include a parameter identifier 1210, a resource component 1215, a DCI interface 1220, a communication interface 1225, a RRC interface 1230, a control signal component 1235, and a zone identifier 1240. Each of these modules may communicate, directly or indirectly, with one another (e.g., via one or more buses).

The parameter identifier 1210 may determine, that a first UE is configured with a first set of power control parameters and a second set of power control parameters.

The resource component 1215 may determine at least one first resource for a communication with a second UE. In some examples, the resource component 1215 may determine the indication based on identifying that the at least one second resource partially overlaps with the at least one first resources.

The DCI interface 1220 may transmit, to the first UE, a DCI message that includes an indication to use one or both of the first set of power control parameters and the second set of power control parameters for a sidelink message based on the at least one resource for the communication with the second UE.

In some examples, the DCI interface 1220 may transmit the DCI that includes a field with the indication to use one or both of the first set of power control parameters or the second set of power control parameters. In some examples, the DCI interface 1220 may transmit the DCI message that schedules at least one second resource for the sidelink message.

In some examples, the DCI interface 1220 may determine the indication based on identifying that the at least one second resource is different from the at least one first resource.

In some examples, the DCI interface 1220 may transmit the DCI that indicates that the first UE is to use either the first set of power control parameters or the second set of power control parameters, where both the first set of power control parameters and the second set of power control parameters are associated with a downlink pathloss from the base station to the first UE.

In some examples, the DCI interface 1220 may transmit the DCI that indicates that the first UE is to use the second set of power control parameters for the sidelink message, where the first set of power control parameters is associated with a downlink pathloss from the base station to the first UE and the second set of power control parameters is associated with a sidelink pathloss.

In some examples, the DCI interface 1220 may transmit the DCI that indicates that the first UE is to use both the first set of power control parameters and the second set of power control parameters for the sidelink message, where the first set of power control parameters is associated with a downlink pathloss from the base station to the first UE and the second set of power control parameters is associated with a sidelink pathloss.

In some examples, the DCI interface 1220 may transmit the DCI that indicates that the first UE is to use either the first set of power control parameters or the second set of power control parameters, where both the first set of power control parameters and the second set of power control parameters are associated with a sidelink pathloss.

In some examples, the DCI interface 1220 may transmit the downlink control information in a group common DCI message that includes the indication for each resource of a set of resources.

In some examples, the DCI interface 1220 may transmit the downlink control information in a group common DCI message that includes the indication for each UE of a set of UEs.

In some examples, the DCI interface 1220 may transmit a control signal that indicates a value for a target receive power and a value for a pathloss compensation component for the first set of power control parameters and the second set of power control parameters.

In some examples, the DCI interface 1220 may transmit a control signal that indicates a value for a target receive power for the first set of power control parameters and the second set of power control parameters.

In some examples, the DCI interface 1220 may determine the indication based on geographical zone. In some cases, the field includes a bit flag. The communication interface 1225 may communicate with the second UE using the at least one resource.

In some examples, the DCI interface 1220 may transmit, to the first UE, an indication of a radio network temporary identifier that corresponds to a group common DCI message, and transmit the group common DCI that is scrambled by the radio network temporary identifier and includes the indication.

The RRC interface 1230 may transmit, to the first UE, a radio resource control signal or the DCI message that indicates the first set of power control parameters and the second set of power control parameters.

The control signal component 1235 may transmit a control signal that indicates a value for a target receive power for the first set of power control parameters and an offset value that indicates a value for a target receive power for the second set of power control parameters.

In some examples, the control signal component 1235 may transmit a control signal that indicates that the first set of power control parameters and the second set of power control parameters are associated with a first priority.

The zone identifier 1240 may identify a geographical zone associated with the first UE or a third UE scheduled to receive a sidelink message from the first UE. In some examples, the zone identifier 1240 may transmit a control signal that indicates sets of parameters to utilize per geographical zone of a set of geographical zones.

Figure 13:
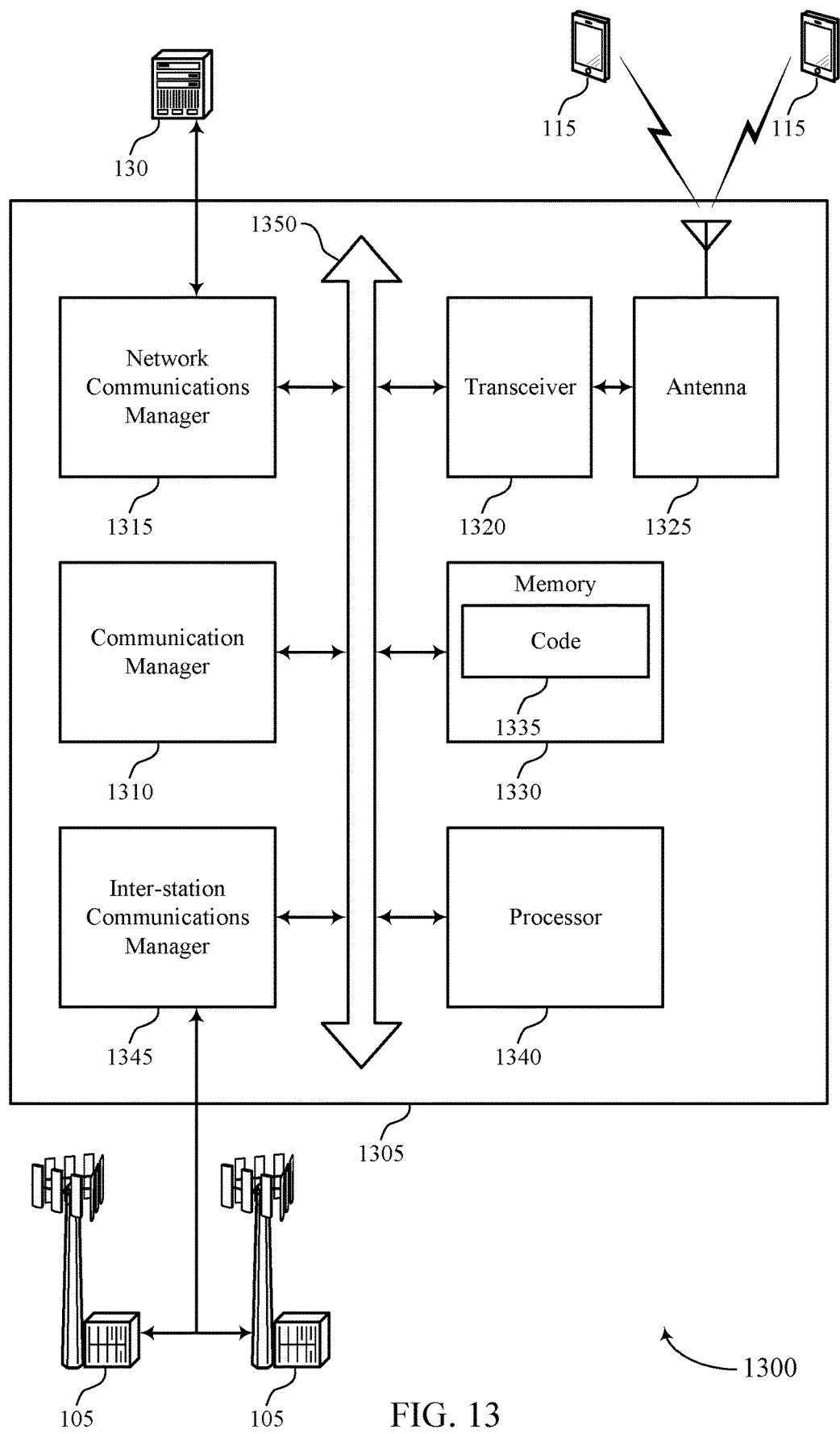
FIG. 13 shows a diagram of a system including a device that supports sidelink power control using shared resources in accordance with one or more aspects of the present disclosure.

FIG. 13 shows a diagram of a system 1300 including a device 1305 that supports sidelink power control using shared resources in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communication manager 1315, a transceiver 1320, an antenna 1325, memory 1330, a processor 1340, and an inter-station communication manager 1345. These components may be in electronic communication via one or more buses (e.g., bus 1350).

The communication manager 1310 may determine, that a first UE is configured with a first set of power control parameters and a second set of power control parameters, determine at least one first resource for a communication with a second UE, transmit, to the first UE, a DCI message that includes an indication to use one or both of the first set of power control parameters and the second set of power control parameters for a sidelink message based on the at least one resource for the communication with the second UE, and communicate with the second UE using the at least one resource.

The network communication manager 1315 may manage communications with the core network (e.g., via one or more wired backhaul links). For example, the network communication manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communication. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting sidelink power control using shared resources).

The inter-station communication manager 1345 may manage communications with other base station 105, and may include a controller or scheduler for controlling communications with UEs 115 in cooperation with other base stations 105. For example, the inter-station communication manager 1345 may coordinate scheduling for transmissions to UEs 115 for various interference mitigation techniques such as beamforming or joint transmission. In some examples, the inter-station communication manager 1345 may provide an X2 interface within an LTE/LTE-A wireless communication network technology to provide communication between base stations 105.

Figure 14:
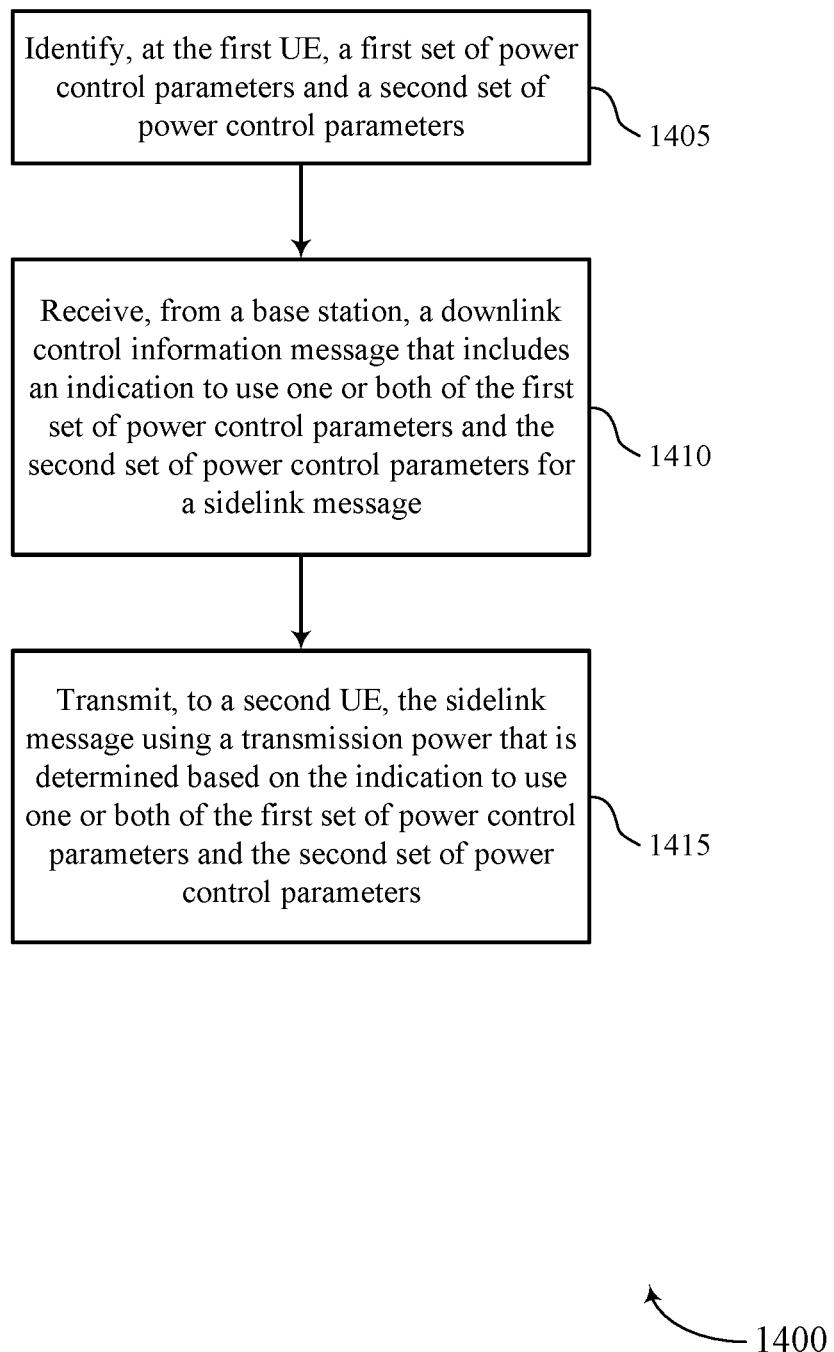
FIGS. 14 through 18 show flowcharts illustrating methods that support sidelink power control using shared resources in accordance with one or more aspects of the present disclosure.

FIG. 14 shows a flowchart illustrating a method 1400 that supports sidelink power control using shared resources in accordance with one or more aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may identify, at the first UE, a first set of power control parameters and a second set of power control parameters. The operations of 1405 may be performed according to the methods described herein. In some examples, aspects of the operations of 1405 may be performed by a parameter identifier as described with reference to FIGS. 6 through 9.

At 1410, the UE may receive, from a base station, a DCI message that includes an indication to use one or both of the first set of power control parameters and the second set of power control parameters for a sidelink message. The operations of 1410 may be performed according to the methods described herein. In some examples, aspects of the operations of 1410 may be performed by a DCI interface as described with reference to FIGS. 6 through 9.

At 1415, the UE may transmit, to a second UE, the sidelink message using a transmission power that is determined based on the indication to use one or both of the first set of power control parameters and the second set of power control parameters. The operations of 1415 may be performed according to the methods described herein. In some examples, aspects of the operations of 1415 may be performed by a sidelink interface as described with reference to FIGS. 6 through 9.

Figure 15:
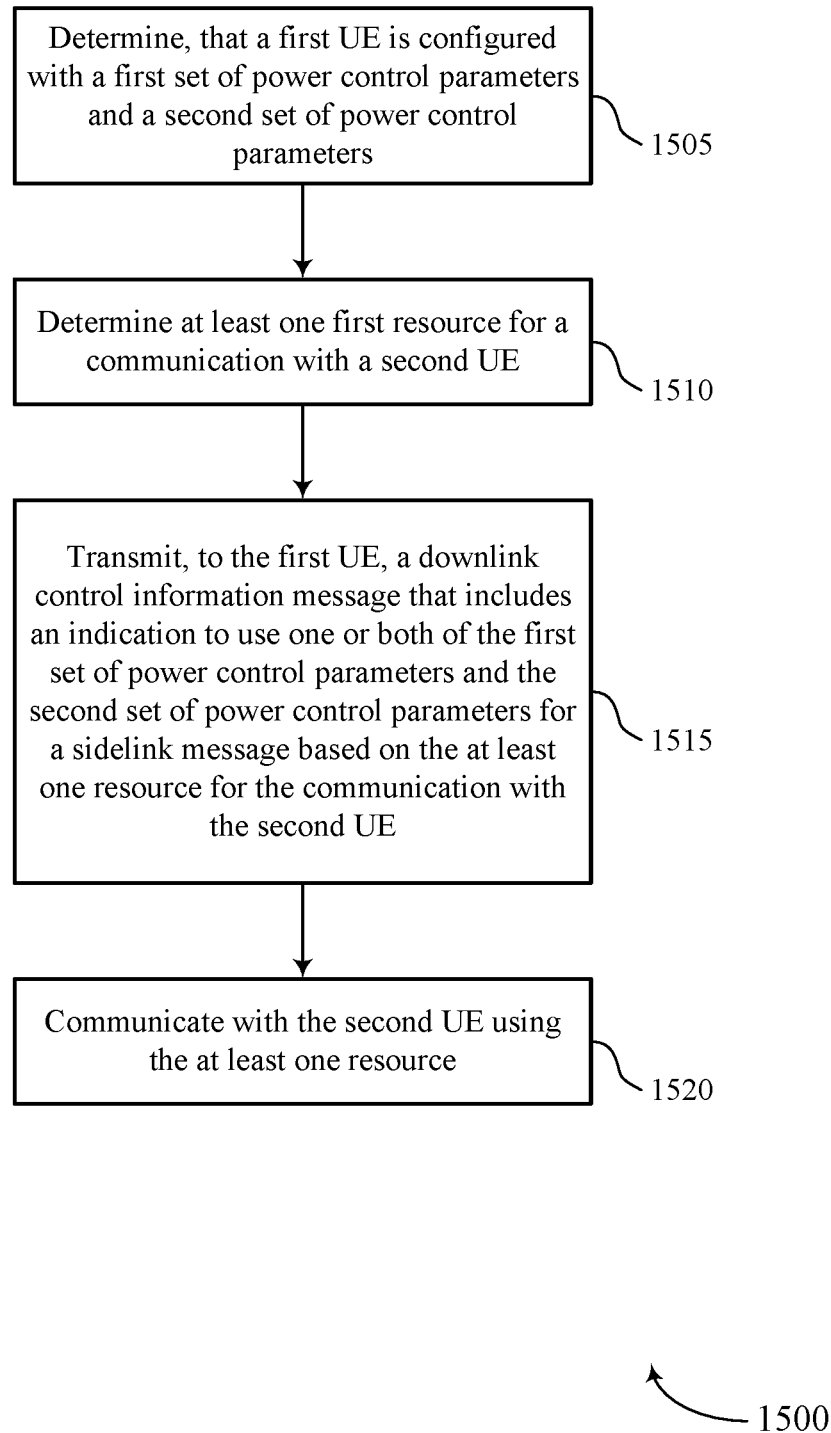

FIG. 15 shows a flowchart illustrating a method 1500 that supports sidelink power control using shared resources in accordance with one or more aspects of the present disclosure. The operations of method 1500 may be implemented by a base station 105 or its components as described herein. For example, the operations of method 1500 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1505, the base station may determine, that a first UE is configured with a first set of power control parameters and a second set of power control parameters. The operations of 1505 may be performed according to the methods described herein. In some examples, aspects of the operations of 1505 may be performed by a parameter identifier as described with reference to FIGS. 10 through 13.

At 1510, the base station may determine at least one first resource for a communication with a second UE. The operations of 1510 may be performed according to the methods described herein. In some examples, aspects of the operations of 1510 may be performed by a resource component as described with reference to FIGS. 10 through 13.

At 1515, the base station may transmit, to the first UE, a DCI message that includes an indication to use one or both of the first set of power control parameters and the second set of power control parameters for a sidelink message based on the at least one resource for the communication with the second UE. The operations of 1515 may be performed according to the methods described herein. In some examples, aspects of the operations of 1515 may be performed by a DCI interface as described with reference to FIGS. 10 through 13.

At 1520, the base station may communicate with the second UE using the at least one resource. The operations of 1520 may be performed according to the methods described herein. In some examples, aspects of the operations of 1520 may be performed by a communication interface as described with reference to FIGS. 10 through 13.

Figure 16:
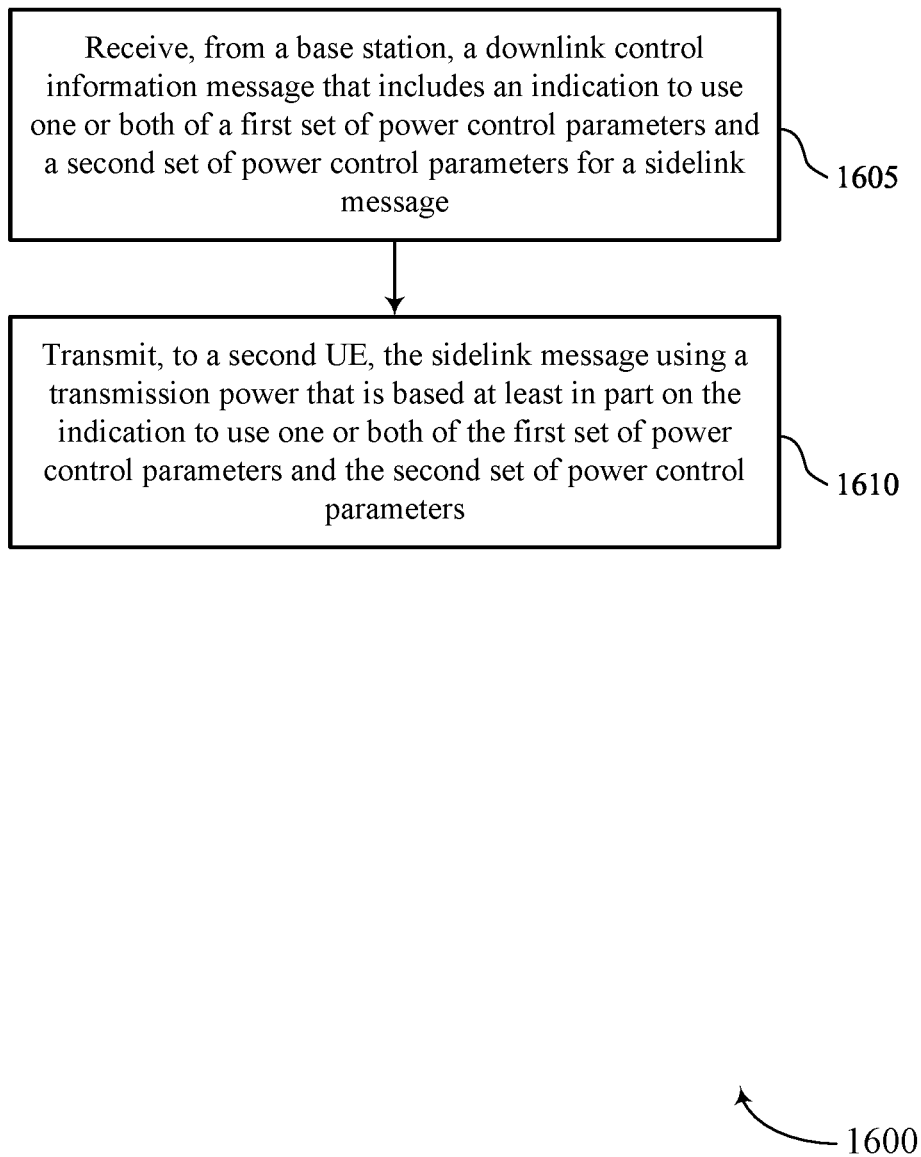

FIG. 16 shows a flowchart illustrating a method 1400 that supports sidelink power control using shared resources in accordance with one or more aspects of the present disclosure. The operations of the method 1600 may be implemented by a UE or its components as described herein. For example, the operations of the method 1600 may be performed by a UE 115 as described with reference to FIGS. 1 through 9 and/or a communications manager as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a DCI message that includes an indication to use one or both of a first set of power control parameters and a second set of power control parameters for a sidelink message. The operations of 1605 may be performed in accordance with examples as disclosed herein. In some examples, aspects of the operations of 1605 may be performed by a DCI interface 815 as described with reference to FIG. 8. In some examples, the DCI may include the indication to use either the first set of power control parameters or the second set of power control parameters, wherein both the first set of power control parameters and the second set of power control parameters are associated with a downlink pathloss from the base station to the first UE. In some examples, the DCI may include the indication to use the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use both the first set of power control parameters and the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use either the first set of power control parameters or the second set of power control parameters, wherein both the first set of power control parameters and the second set of power control parameters are associated with a sidelink pathloss between the first UE and the second UE. In some examples, the DCI is included in a group common DCI that includes the indication per resource or per UE (e.g., using an RNTI), or both.

At 1610, the method may include transmitting, to a second UE, the sidelink message using a transmission power that is based on the indication to use one or both of the first set of power control parameters and the second set of power control parameters. The operations of 1610 may be performed in accordance with examples as disclosed herein. In some examples, aspects of the operations of 1610 may be performed by a sidelink interface 820 as described with reference to FIG. 8.

Figure 17:
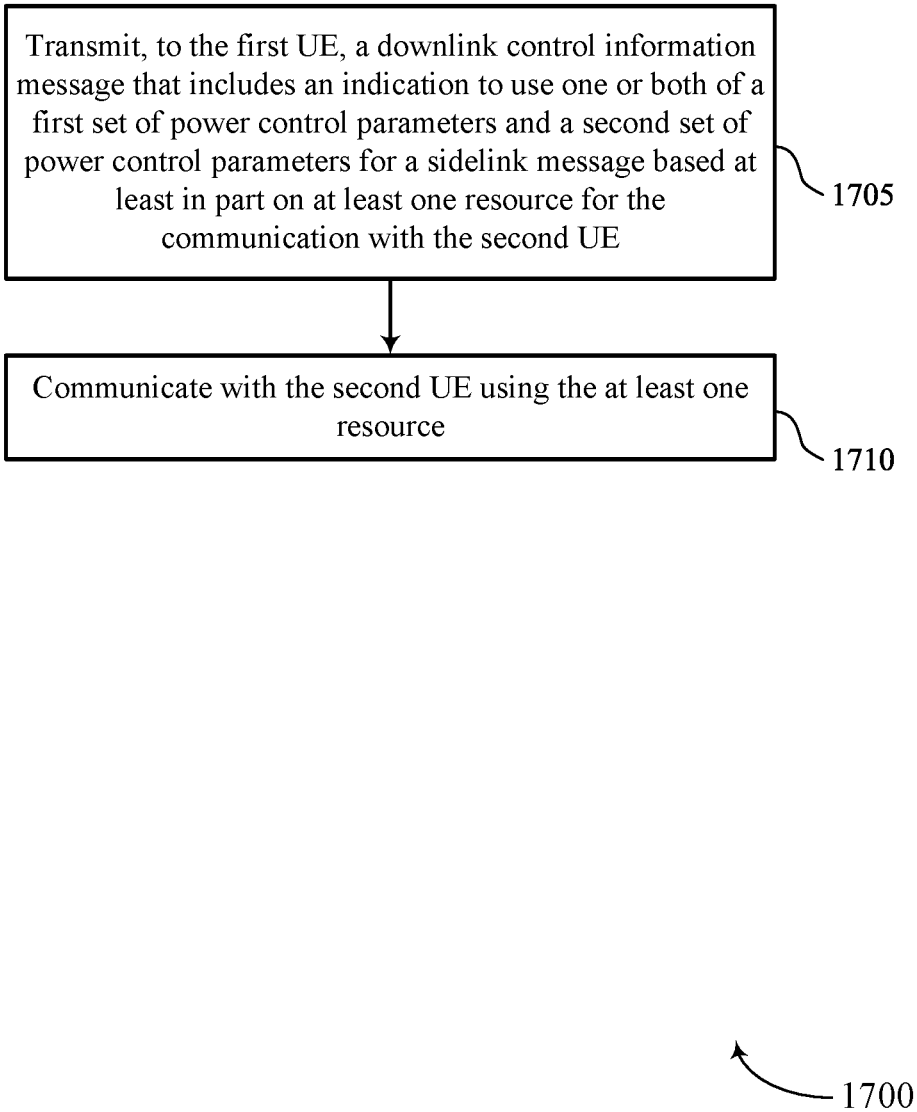

FIG. 17 shows a flowchart illustrating a method 1500 that supports sidelink power control using shared resources in accordance with one or more aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to the first UE, a DCI message that includes an indication to use one or both of a first set of power control parameters and a second set of power control parameters for a sidelink message based on at least one resource for the communication with the second UE. The operations of 1705 may be performed in accordance with examples as disclosed herein. In some examples, aspects of the operations of 1705 may be performed by a DCI interface 1220 as described with reference to FIG. 12. In some examples, the DCI may include the indication to use either the first set of power control parameters or the second set of power control parameters, wherein both the first set of power control parameters and the second set of power control parameters are associated with a downlink pathloss from the base station to the first UE. In some examples, the DCI may include the indication to use the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use both the first set of power control parameters and the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use either the first set of power control parameters or the second set of power control parameters, wherein both the first set of power control parameters and the second set of power control parameters are associated with a sidelink pathloss between the first UE and the second UE. In some examples, the DCI is included in a group common DCI that includes the indication per resource or per UE (e.g., using an RNTI), or both.

At 1710, the method may include communicating with the second UE using the at least one resource. The operations of 1710 may be performed in accordance with examples as disclosed herein. In some examples, aspects of the operations of 1710 may be performed by a communication interface 1225 as described with reference to FIG. 12.

Figure 18:
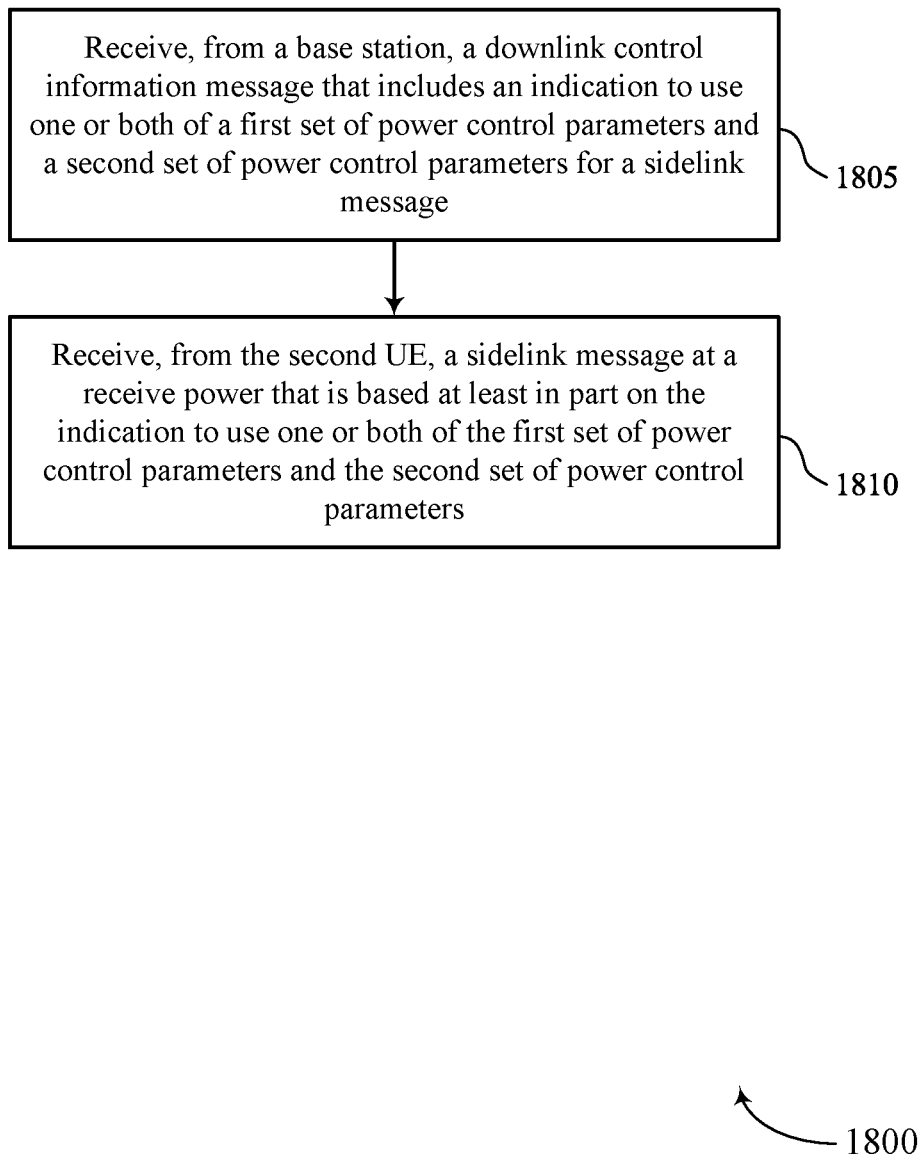

FIG. 18 shows a flowchart illustrating a method 1800 that supports sidelink power control using shared resources in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a DCI message that includes an indication to use one or both of a first set of power control parameters and a second set of power control parameters for a sidelink message. The operations of 1805 may be performed in accordance with examples as disclosed herein. In some examples, aspects of the operations of 1805 may be performed by a DCI interface 815 as described with reference to FIG. 8. In some examples, the DCI may include the indication to use either the first set of power control parameters or the second set of power control parameters, wherein both the first set of power control parameters and the second set of power control parameters are associated with a downlink pathloss from the base station to the first UE. In some examples, the DCI may include the indication to use the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use both the first set of power control parameters and the second set of power control parameters for the sidelink message, wherein the first set of power control parameters is associated with a downlink pathloss from the base station to the first UE and the second set of power control parameters is associated with a sidelink pathloss between the first UE and the second UE. In some examples, the DCI may include the indication to use either the first set of power control parameters or the second set of power control parameters, wherein both the first set of power control parameters and the second set of power control parameters are associated with a sidelink pathloss between the first UE and the second UE. In some examples, the DCI is included in a group common DCI that includes the indication per resource or per UE (e.g., using an RNTI), or both.

At 1810, the method may include receiving, from the second UE, a sidelink message at a receive power that is based on the indication to use one or both of the first set of power control parameters and the second set of power control parameters. The operations of 1810 may be performed in accordance with examples as disclosed herein. In some examples, aspects of the operations of 1810 may be performed by a sidelink interface 820 as described with reference to FIG. 8.

The following provides a first overview of aspects of the present invention:

Aspect 1: A method for wireless communications at a first UE, comprising: receiving, from a base station, a DCI message that includes an indication to use one or both of a first set of power control parameters and a second set of power control parameters for a sidelink message; and transmitting, to a second UE, the sidelink message using a transmission power that is based at least in part on the indication to use one or both of the first set of power control parameters and the second set of power control parameters.

Aspect 2: The method of aspect 1, further comprising: receiving, from the base station, a radio resource control signal or the DCI message that indicates the first set of power control parameters and the second set of power control parameters.

Aspect 3: The method of any of aspects 1 through 2, wherein receiving the DCI message comprises: receiving the DCI message that includes a field with the indication to use one or both of the first set of power control parameters or the second set of power control parameters, wherein the sidelink message is transmitted using the transmission power determined in accordance with a value included in the field.

Aspect 4: The method of aspect 3, wherein the field comprises a bit flag.

Aspect 5: The method of any of aspects 1 through 4, wherein receiving the DCI message comprises: receiving the DCI message that schedules at least one resource for the sidelink message to be transmitted to the second UE.

Aspect 6: The method of any of aspects 1 through 5, wherein transmitting the sidelink message comprises: determining that the DCI message includes the indication to use either the first set of power control parameters or the second set of power control parameters, wherein both the first set of power control parameters and the second set of power control parameters are associated with a downlink pathloss from the base station to the first UE; and transmitting the sidelink message using the transmission power that is determined based at least in part on the first set of power control parameters or the second set of power control parameters in accordance with the indication.

Aspect 7: The method of any of aspects 1 through 5, wherein transmitting the sidelink message comprises: determining that the DCI message includes the indication to use the second set of power control parameters for the sidelink message, wherein the first set of power control parameters is associated with a downlink pathloss from the base station to the first UE and the second set of power control parameters is associated with a sidelink pathloss between the first UE and the second UE; and transmitting the sidelink message using the transmission power that is determined based at least in part on the second set of power control parameters in accordance with the indication.

Aspect 8: The method of any of aspects 1 through 5, wherein transmitting the sidelink message comprises: determining that the DCI message includes the indication to use both the first set of power control parameters and the second set of power control parameters for the sidelink message, wherein the first set of power control parameters is associated with a downlink pathloss from the base station to the first UE and the second set of power control parameters is associated with a sidelink pathloss between the first UE and the second UE; identifying a lower transmission power of a first transmission power determined using the first set of power control parameters and a second transmission power determined using the second set of power control parameters; and transmitting the sidelink message using the lower transmission power based at least in part on determining that the DCI message includes the indication to use both the first set of power control parameters and the second set of power control parameters.

Aspect 9: The method of any of aspects 1 through 5, wherein transmitting the sidelink message comprises: determining that the DCI message includes the indication to use either the first set of power control parameters or the second set of power control parameters, wherein both the first set of power control parameters and the second set of power control parameters are associated with a sidelink pathloss between the first UE and the second UE; and transmitting the sidelink message using the transmission power that is determined based at least in part on the first set of power control parameters or the second set of power control parameters in accordance with the indication.

Aspect 10: The method of any of aspects 1 through 9, wherein receiving the DCI message comprises: receiving the DCI message in a group common DCI message that includes the indication for each resource of a set of resources, wherein the transmission power is determining based at in least in part on a resource used for transmission of the sidelink message.

Aspect 11: The method of any of aspects 1 through 10, wherein receiving the DCI message comprises: receiving the DCI message in a group common DCI message that includes the indication for each UE of a set of UEs, wherein the transmission power is determined based at least in part on the indication that corresponds to the first UE.

Aspect 12: The method of any of aspects 1 through 11, wherein receiving the DCI message comprises: receiving, from the base station, an indication of a radio network temporary identifier that corresponds to a group common DCI message; and receiving the DCI message in the group common DCI message that is scrambled by the radio network temporary identifier and includes the indication.

Aspect 13: The method of any of aspects 1 through 12, further comprising: identifying a value for a target receive power and a value for a pathloss compensation component for the first set of power control parameters and the second set of power control parameters.

Aspect 14: The method of any of aspects 1 through 13, further comprising: identifying a value for a target receive power for the first set of power control parameters and the second set of power control parameters.

Aspect 15: The method of any of aspects 1 through 14, further comprising: identifying a value for a target receive power for the first set of power control parameters and an offset value; and identifying a value for a target receive power for the second set of power control parameters based at least in part on the value for the target receive power for the first set of power control parameters and the offset value.

Aspect 16: The method of any of aspects 1 through 15, further comprising: determining that the sidelink message is associated with a first priority; and identifying the first set of power control parameters and the second set of power control parameters based at least in part on the first priority.

Aspect 17: The method of any of aspects 1 through 16, further comprising: receiving a control signal that indicates sets of parameters to utilize per geographical zone of a set of geographical zones; identifying a geographical zone in which the first UE or the second UE is positioned; and identifying the first set of power control parameters and the second set of power control parameters based at least in part on the identified geographical zone.

Aspect 18: A method for wireless communications at a base station, comprising: transmitting, to the first UE, a DCI message that includes an indication to use one or both of a first set of power control parameters and a second set of power control parameters for a sidelink message based at least in part on at least one resource for communication with the second UE; and communicating with the second UE using the at least one resource.

Aspect 19: The method of aspect 18, further comprising: transmitting, to the first UE, a radio resource control signal or the DCI message that indicates the first set of power control parameters and the second set of power control parameters.

Aspect 20: The method of any of aspects 18 through 19, wherein transmitting the DCI message comprises: transmitting the DCI message that includes a field with the indication to use one or both of the first set of power control parameters or the second set of power control parameters.

Aspect 21: The method of aspect 20, wherein the field comprises a bit flag.

Aspect 22: The method of any of aspects 18 through 21, wherein transmitting the DCI message comprises: transmitting the DCI message that schedules at least one second resource for the sidelink message.

Aspect 23: The method of any of aspects 18 through 22, further comprising: determining the indication based at least in part on identifying that the at least one second resource partially overlaps with the at least one resource.

Aspect 24: The method of any of aspects 18 through 23, further comprising: identifying a geographical zone associated with the first UE or a third UE scheduled to receiving a sidelink message from the first UE; and determining the indication based at least in part on geographical zone.

Aspect 25: The method of any of aspects 18 through 24, further comprising: transmitting a control signal that indicates sets of parameters to utilize per geographical zone of a set of geographical zones.

Aspect 26: A method for wireless communications at a first UE comprising: receiving, from a base station, a DCI message that includes an indication to use one or both of a first set of power control parameters and a second set of power control parameters for a sidelink message; and receiving, from the second UE, a sidelink message at a receive power that is based at least in part on the indication to use one or both of the first set of power control parameters and the second set of power control parameters.

Aspect 27: The method of aspect 26, further comprising: determining, based at least in part on the DCI message, that a second UE is to transmit the sidelink message to the first UE using a transmission power that is determined in accordance with the indication.

Aspect 28: The method of any of aspects 26 through 27, wherein receiving the DCI message comprises: receiving the DCI message in a group common DCI message that includes the indication for each UE of a set of UEs.

Aspect 29: The method of any of aspects 26 through 28, further comprising: receiving the DCI message in a group common DCI message that includes the indication for each resource of a set of resources.

Aspect 30: An apparatus for wireless communications at a first UE, comprising a processor; memory coupled with the processor, the processor and memory configured to perform a method of any of aspects 1 through 17.

Aspect 31: An apparatus for wireless communications at a first UE, comprising at least one means for performing a method of any of aspects 1 through 17.

Aspect 32: A non-transitory computer-readable medium storing code for wireless communications at a first UE, the code comprising instructions executable by a processor to perform a method of any of aspects 1 through 17.

Aspect 33: An apparatus for wireless communications at a base station, comprising a processor memory coupled with the processor, the processor and memory configured to perform a method of any of aspects 18 through 25.

Aspect 34: An apparatus for wireless communications at a base station, comprising at least one means for performing a method of any of aspects 18 through 25.

Aspect 35: A non-transitory computer-readable medium storing code for wireless communications at a base station, the code comprising instructions executable by a processor to perform a method of any of aspects 18 through 25.

Aspect 36: An apparatus comprising a processor; m memory coupled with the processor, the processor and memory configured to perform a method of any of aspects 26 through 29.

Aspect 37: An apparatus comprising at least one means for performing a method of any of aspects 26 through 29.

Aspect 38: A non-transitory computer-readable medium storing code the code comprising instructions executable by a processor to perform a method of any of aspects 26 through 29.

The following provides a second overview of aspects of the present invention:

Aspect 1: A method for wireless communications at a first UE, comprising: identifying, at the first UE, a first set of power control parameters and a second set of power control parameters; receiving, from a base station, a DCI message that includes an indication to use one or both of the first set of power control parameters and the second set of power control parameters for a sidelink message; and transmitting, to a second UE, the sidelink message using a transmission power that is determined based at least in part on the indication to use one or both of the first set of power control parameters and the second set of power control parameters.

Aspect 2: The method of aspect 1, wherein identifying the first set of power control parameters and the second set of power control parameters comprises: receiving, from the base station, a radio resource control signal or the DCI message that indicates the first set of power control parameters and the second set of power control parameters.

Aspect 3: The method of any one of aspects 1 through 2, wherein receiving the DCI message comprises: receiving the DCI message that includes a field with the indication to use one or both of the first set of power control parameters or the second set of power control parameters, wherein the sidelink message is transmitted using the transmission power determined in accordance with a value included in the field.

Aspect 4: The method of aspect 3, wherein the field comprises a bit flag.

Aspect 5: The method of any one of aspects 1 through 4, wherein receiving the DCI message comprises: receiving the DCI message that schedules at least one resource for the sidelink message to be transmitted to the second UE.

Aspect 6: The method of any one of aspects 1 through 5, wherein transmitting the sidelink message comprises: determining that the DCI message includes the indication to use either the first set of power control parameters or the second set of power control parameters, wherein both the first set of power control parameters and the second set of power control parameters are associated with a downlink pathloss from the base station to the first UE; and transmitting the sidelink message using the transmission power that is determined based at least in part on the first set of power control parameters or the second set of power control parameters in accordance with the indication.

Aspect 7: The method of any one of aspects 1 through 5, wherein transmitting the sidelink message comprises: determining that the DCI message includes the indication to use the second set of power control parameters for the sidelink message, wherein the first set of power control parameters is associated with a downlink pathloss from the base station to the first UE and the second set of power control parameters is associated with a sidelink pathloss between the first UE and the second UE; and transmitting the sidelink message using the transmission power that is determined based at least in part on the second set of power control parameters in accordance with the indication.

Aspect 8: The method of any one of aspects 1 through 5, wherein transmitting the sidelink message comprises: determining that the DCI message includes the indication to use both the first set of power control parameters and the second set of power control parameters for the sidelink message, wherein the first set of power control parameters is associated with a downlink pathloss from the base station to the first UE and the second set of power control parameters is associated with a sidelink pathloss between the first UE and the second UE; identifying a lower transmission power of a first transmission power determined using the first set of power control parameters and a second transmission power determined using the second set of power control parameters; and transmitting the sidelink message using the lower transmission power based at least in part on determining that the DCI message includes the indication to use both the first set of power control parameters and the second set of power control parameters.

Aspect 9: The method of any one of aspects 1 through 5, wherein transmitting the sidelink message comprises: determining that the DCI message includes the indication to use either the first set of power control parameters or the second set of power control parameters, wherein both the first set of power control parameters and the second set of power control parameters are associated with a sidelink pathloss between the first UE and the second UE; and transmitting the sidelink message using the transmission power that is determined based at least in part on the first set of power control parameters or the second set of power control parameters in accordance with the indication.

Aspect 10: The method of any one of aspects 1 through 9, wherein receiving the DCI message comprises: receiving a group common DCI message that includes the indication for each resource of a set of resources, wherein the transmission power is determined based in least in part on a resource used for transmission of the sidelink message.

Aspect 11: The method of any one of aspects 1 through 9, wherein receiving the DCI message comprises: receiving a group common DCI message that includes the indication for each UE of a set of UEs, wherein the transmission power is determined based at least in part on the indication that corresponds to the first UE.

Aspect 12: The method of any one of aspects 1 through 11, wherein receiving the DCI message comprises: receiving, from the base station, an indication of a radio network temporary identifier that corresponds to a group common DCI message; and receiving the group common DCI message that includes the indication.

Aspect 13: The method of any one of aspects 1 through 12, wherein identifying the first set of power control parameters and the second set of power control parameters comprises: identifying a value for a target receive power and a value for a pathloss compensation component for the first set of power control parameters and the second set of power control parameters.

Aspect 14: The method of any one of aspects 1 through 12, wherein identifying the first set of power control parameters and the second set of power control parameters comprises: identifying a value for a target receive power for the first set of power control parameters and the second set of power control parameters.

Aspect 15: The method of any one of aspects 1 through 14, wherein identifying the first set of power control parameters and the second set of power control parameters comprises: identifying a value for a target receive power for the first set of power control parameters and an offset value; and identifying a value for a target receive power for the second set of power control parameters based at least in part on the value for the target receive power for the first set of power control parameters and the offset value.

Aspect 16: The method of any one of aspects 1 through 15, wherein identifying the first set of power control parameters and the second set of power control parameters comprises: determining that the sidelink message is associated with a first priority; and identifying the first set of power control parameters and the second set of power control parameters based at least in part on the first priority.

Aspect 17: The method of any one of aspects 1 through 16, wherein identifying the first set of power control parameters and the second set of power control parameters comprises: receiving a control signal that indicates sets of parameters to utilize per geographical zone of a set of geographical zones; identifying a geographical zone in which the first UE or the second UE is positioned; and identifying the first set of power control parameters and the second set of power control parameters based at least in part on the identified geographical zone.

Aspect 18: A method for wireless communications at a base station, comprising: determining, that a first UE is configured with a first set of power control parameters and a second set of power control parameters; determining at least one first resource for a communication with a second UE; transmitting, to the first UE, a DCI message that includes an indication to use one or both of the first set of power control parameters and the second set of power control parameters for a sidelink message based at least in part on the at least one resource for the communication with the second UE; and communicating with the second UE using the at least one resource.

Aspect 19: The method of aspect 18, wherein determining that the first UE is configured with the first set of power control parameters and the second set of power control parameters comprises: transmitting, to the first UE, a radio resource control signal or the DCI message that indicates the first set of power control parameters and the second set of power control parameters.

Aspect 20: The method of aspect 18, wherein transmitting the DCI message comprises: transmitting the DCI that includes a field with the indication to use one or both of the first set of power control parameters or the second set of power control parameters.

Aspect 21: The method of aspect 20, wherein the field comprises a bit flag.

Aspect 22: The method of any one of aspects 18 through 21, wherein transmitting the DCI message comprises: transmitting the DCI message that schedules at least one second resource for the sidelink message.

Aspect 23: The method of any one of aspects 18 through 22, further comprising: determining the indication based at least in part on identifying that the at least one second resource partially overlaps with the at least one first resources.

Aspect 24: The method of any one of aspects 18 through 22, further comprising: determining the indication based at least in part on identifying that the at least one second resource is different from the at least one first resource.

Aspect 25: The method of any one of aspects 18 through 24, transmitting the DCI message comprises: transmitting the DCI that indicates that the first UE is to use either the first set of power control parameters or the second set of power control parameters, wherein both the first set of power control parameters and the second set of power control parameters are associated with a downlink pathloss from the base station to the first UE.

Aspect 26: The method of any one of aspects 18 through 24, wherein transmitting the DCI message comprises: transmitting the DCI that indicates that the first UE is to use the second set of power control parameters for the sidelink message, wherein the first set of power control parameters is associated with a downlink pathloss from the base station to the first UE and the second set of power control parameters is associated with a sidelink pathloss.

Aspect 27: The method of any one of aspects 18 through 24, wherein transmitting the DCI message comprises: transmitting the DCI that indicates that the first UE is to use both the first set of power control parameters and the second set of power control parameters for the sidelink message, wherein the first set of power control parameters is associated with a downlink pathloss from the base station to the first UE and the second set of power control parameters is associated with a sidelink pathloss.

Aspect 28: The method of any one of aspects 18 through 24, wherein transmitting the DCI message comprises: transmitting the DCI that indicates that the first UE is to use either the first set of power control parameters or the second set of power control parameters, wherein both the first set of power control parameters and the second set of power control parameters are associated with a sidelink pathloss.

Aspect 29: The method of any one of aspects 18 through 28, wherein transmitting the DCI message comprises: transmitting a group common DCI message that includes the indication for each resource of a set of resources.

Aspect 30: The method of any one of aspects 18 through 28, wherein transmitting the DCI message comprises: transmitting a group common DCI message that includes the indication for each UE of a set of UEs.

Aspect 31: The method of any one of aspects 18 through 30, wherein transmitting the DCI message comprises: transmitting, to the first UE, an indication of a radio network temporary identifier that corresponds to a group common DCI message; and transmitting the group common DCI that includes the indication.

Aspect 32: The method of any one of aspects 18 through 31, wherein determining that the first UE is configured with the first set of power control parameters and the second set of power control parameters comprises: transmitting a control signal that indicates a value for a target receive power and a value for a pathloss compensation component for the first set of power control parameters and the second set of power control parameters.

Aspect 33: The method of any one of aspects 18 through 31, wherein determining that the first UE is configured with the first set of power control parameters and the second set of power control parameters comprises: transmitting a control signal that indicates a value for a target receive power for the first set of power control parameters and the second set of power control parameters.

Aspect 34: The method of any one of aspects 18 through 33, wherein determining that the first UE is configured with the first set of power control parameters and the second set of power control parameters comprises: transmitting a control signal that indicates a value for a target receive power for the first set of power control parameters and an offset value that indicates a value for a target receive power for the second set of power control parameters.

Aspect 35: The method of any one of aspects 18 through 34, wherein determining that the first UE is configured with the first set of power control parameters and the second set of power control parameters comprises: transmitting a control signal that indicates that the first set of power control parameters and the second set of power control parameters are associated with a first priority.

Aspect 36: The method of any one of aspects 18 through 35, further comprising: identifying a geographical zone associated with the first UE or a third UE scheduled to receive a sidelink message from the first UE; and determining the indication based at least in part on geographical zone.

Aspect 37: The method of any one of aspects 18 through 36, wherein determining that the first UE is configured with the first set of power control parameters and the second set of power control parameters comprises: transmitting a control signal that indicates sets of parameters to utilize per geographical zone of a set of geographical zones.

Aspect 38: An apparatus for wireless communication comprising at least one means for performing a method of any one of aspects 1 through 17.

Aspect 39: An apparatus for wireless communication comprising a processor and memory coupled to the processor, the processor and memory configured to perform a method of any one of aspects 1 through 17.

Aspect 40: A non-transitory computer-readable medium storing code for wireless communications, the code comprising instructions executable by a processor to perform a method of any one of aspects 1 through 17.

Aspect 41: An apparatus for wireless communication comprising at least one means for performing a method of any one of aspects 18 through 37.

Aspect 42: An apparatus for wireless communication comprising a processor and memory coupled to the processor, the processor and memory configured to perform a method of any one of aspects 18 through 37.

Aspect 43: A non-transitory computer-readable medium storing code for wireless communication, the code comprising instructions executable by a processor to perform a method of any one of aspects 18 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
  a processor;
  memory coupled with the processor, the processor and memory configured to:
    receive, from a network entity, a downlink control information message that includes an indication to use one or both of a first set of power control parameters and a second set of power control parameters for a sidelink message,
    wherein the first set of power control parameters includes a first value for a target receive power and the second set of power control parameters includes a second value for the target receive power; and
    transmit, to a second UE, the sidelink message using a transmission power in accordance with the first value or the second value for the target receive power based at least in part on the indication to use one or both of the first set of power control parameters and the second set of power control parameters.

2. The apparatus of claim 1, further comprising:
  an antenna configured to receive, from the network entity, a radio resource control signal or the downlink control information message that indicates the first set of power control parameters and the second set of power control parameters.

3. The apparatus of claim 1, wherein:
  the downlink control information message includes a field with the indication to use one or both of the first set of power control parameters or the second set of power control parameters, and
  the processor and memory are configured to transmit the sidelink message using the transmission power determined in accordance with a value included in the field.

4. The apparatus of claim 3, wherein the field comprises a bit flag.

5. The apparatus of claim 1, wherein:
  the downlink control information message schedules at least one resource for the sidelink message to be transmitted to the second UE.

6. The apparatus of claim 1, wherein,
  the downlink control information message includes the indication to use either the first set of power control parameters or the second set of power control parameters,
  both the first set of power control parameters and the second set of power control parameters are associated with a downlink pathloss from the network entity to the first UE, and
  the processor and memory are configured to transmit the sidelink message using the transmission power that is based at least in part on the first set of power control parameters or the second set of power control parameters in accordance with the indication.

7. The apparatus of claim 1, wherein:
the downlink control information message includes the indication to use the second set of power control parameters for the sidelink message,
the first set of power control parameters is associated with a downlink pathloss from the network entity to the first UE and the second set of power control parameters is associated with a sidelink pathloss between the first UE and the second UE, and
the processor and memory are configured to transmit the sidelink message using the transmission power that is based at least in part on the second set of power control parameters in accordance with the indication.

8. The apparatus of claim 1, wherein:
the downlink control information message includes the indication to use both the first set of power control parameters and the second set of power control parameters for the sidelink message,
the first set of power control parameters is associated with a downlink pathloss from the network entity to the first UE and the second set of power control parameters is associated with a sidelink pathloss between the first UE and the second UE, and
the processor and memory are configured to transmit the sidelink message using a lower transmission power of transmission powers determined using the first set of power control parameters and the second set of power control parameters.

9. The apparatus of claim 1, wherein:
the downlink control information message includes the indication to use either the first set of power control parameters or the second set of power control parameters,
both the first set of power control parameters and the second set of power control parameters are associated with a sidelink pathloss between the first UE and the second UE, and
the processor and memory are configured to transmit the sidelink message using the transmission power that is determined based at least in part on the first set of power control parameters or the second set of power control parameters in accordance with the indication.

10. The apparatus of claim 1, wherein, to receive the downlink control information message, the processor and memory are configured to:
receive the downlink control information message in a group common downlink control information message that includes the indication for each resource of a set of resources,
wherein the transmission power is determined based at in least in part on a resource used for transmission of the sidelink message.

11. The apparatus of claim 1, wherein, to receive the downlink control information message, the processor and memory are configured to:
receive the downlink control information message in a group common downlink control information message that includes the indication for each UE of a set of UEs,
wherein the transmission power is determined based at least in part on the indication that corresponds to the first UE.

12. The apparatus of claim 1, wherein the processor and memory are configured to:
receive, from the network entity, an indication of a radio network temporary identifier that corresponds to a group common downlink control information message,
wherein the processor and memory are configured to receive the downlink control information message in the group common downlink control information message that is scrambled by the radio network temporary identifier and includes the indication.

13. The apparatus of claim 1, wherein:
the first set of power control parameters and the second set of power control parameters include a respective value for a target receive power and a respective value for a pathloss compensation component.

14. The apparatus of claim 1, wherein:
the first set of power control parameters comprises a value for a target receive power and an offset value, and
a value for a target receive power for the second set of power control parameters is based at least in part on the value for the target receive power and the offset value.

15. The apparatus of claim 1, wherein:
the sidelink message is associated with a first priority, and
the first set of power control parameters and the second set of power control parameters are based at least in part on the first priority.

16. The apparatus of claim 1, wherein the processor and memory are further configured to:
receive a control signal that indicates sets of parameters to utilize per geographical zone of a set of geographical zones, and
wherein the first set of power control parameters and the second set of power control parameters are based at least in part on the geographical zone.

17. An apparatus for wireless communications at a network entity, comprising:
a processor;
memory coupled with the processor, the processor and memory configured to:
transmit, to a first user equipment (UE), a downlink control information message that includes an indication to use one or both of a first set of power control parameters and a second set of power control parameters for a sidelink message based at least in part on at least one resource for communication with a second UE,
wherein the first set of power control parameters includes a first value for a target receive power and the second set of power control parameters includes a second value for the target receive power; and
communicate with the second UE using the at least one resource.

18. The apparatus of claim 17, wherein the processor and memory are further configured to:
transmit, to the first UE, a radio resource control signal or the downlink control information message that indicates the first set of power control parameters and the second set of power control parameters.

19. The apparatus of claim 17, wherein:
the downlink control information message includes a field with the indication to use one or both of the first set of power control parameters or the second set of power control parameters.

20. The apparatus of claim 19, wherein the field comprises a bit flag.

21. The apparatus of claim 17, wherein:
the downlink control information message schedules at least one second resource for the sidelink message.

22. The apparatus of claim 17, wherein:
the indication is based at least in part on at least one second resource partially overlapping with the at least one resource.

23. The apparatus of claim 17, wherein:
a geographical zone is associated with the first UE or a third UE scheduled to receive a sidelink message from the first UE, and
the indication is based at least in part on geographical zone.

24. The apparatus of claim 17, wherein the processor and memory are further configured to:
transmit a control signal that indicates sets of parameters to utilize per geographical zone of a set of geographical zones.

25. An apparatus for wireless communications at a first user equipment (UE), comprising:
a processor;
memory coupled with the processor, the processor and memory configured to:
receive, from a network entity, a downlink control information message that includes an indication to use one or both of a first set of power control parameters and a second set of power control parameters for a sidelink message,
wherein the first set of power control parameters includes a first value for a target receive power and the second set of power control parameters includes a second value for the target receive power; and
receive, from a second UE, a sidelink message at a receive power in accordance with the first value or the second value for the target receive power based at least in part on the indication to use one or both of the first set of power control parameters and the second set of power control parameters.

26. The apparatus of claim 25, wherein:
the processor and memory are configured to transmit the sidelink message to the first UE using a transmission power that is determined in accordance with the indication.

27. The apparatus of claim 25, wherein, to receive the downlink control information message, the processor and memory are configured to:
receive the downlink control information message in a group common downlink control information message that includes the indication for each UE of a set of UEs.

28. The apparatus of claim 25, wherein, to receive the downlink control information message, the processor and memory are configured to:
receive the downlink control information message in a group common downlink control information message that includes the indication for each resource of a set of resources.

29. A method for wireless communications at a first user equipment (UE), comprising:
receiving, from a network entity, a downlink control information message that includes an indication to use one or both of a first set of power control parameters and a second set of power control parameters for a sidelink message,
wherein the first set of power control parameters includes a first value for a target receive power and the second set of power control parameters includes a second value for the target receive power; and
transmitting, to a second UE, the sidelink message using a transmission power in accordance with the first value or the second value for the target receive power based at least in part on the indication to use one or both of the first set of power control parameters and the second set of power control parameters.

* * * * *